Oct. 30, 1934.  G. E. ROWE  1,979,211
GLASSWARE FORMING APPARATUS
Filed Jan. 3, 1933   8 Sheets-Sheet 1

Witness:
H. D. Thayer

Inventor:
George E. Rowe
by Brown & Parham
Attorneys

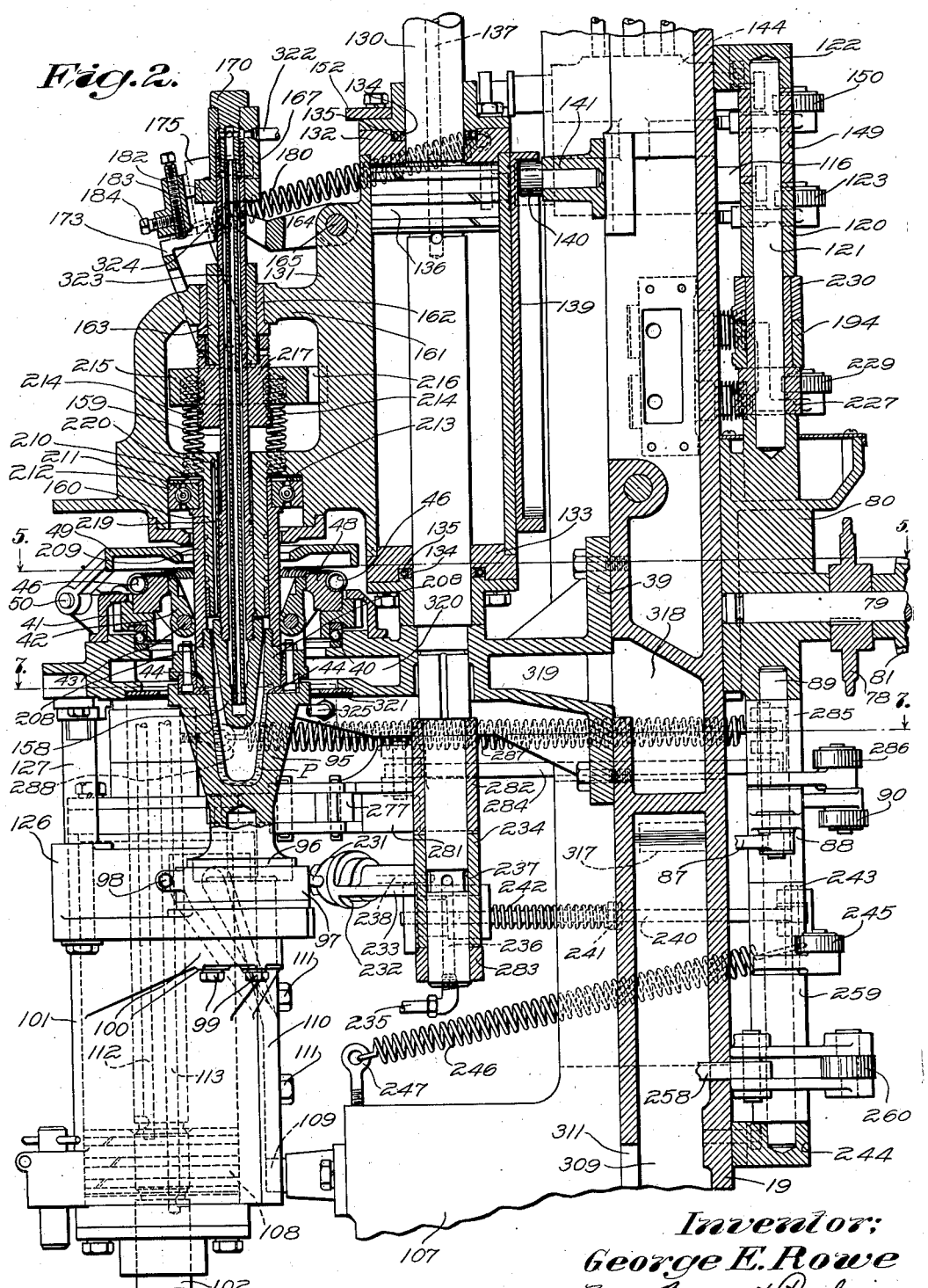

Oct. 30, 1934.　　　　　G. E. ROWE　　　　1,979,211
GLASSWARE FORMING APPARATUS
Filed Jan. 3, 1933　　8 Sheets-Sheet 3
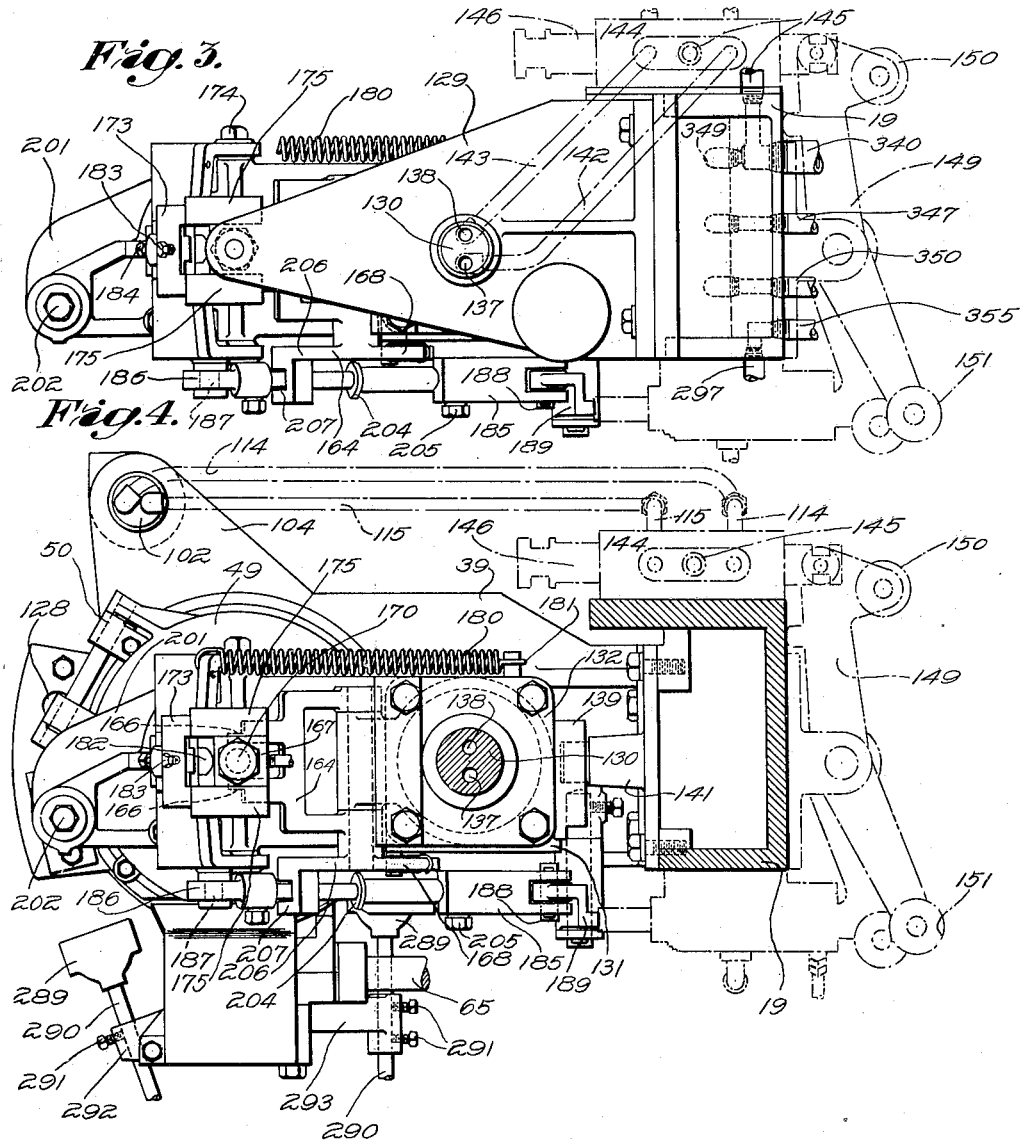
Inventor:
George E. Rowe
by Brown + Parham
Attorneys
Witness:
W. B. Thayer

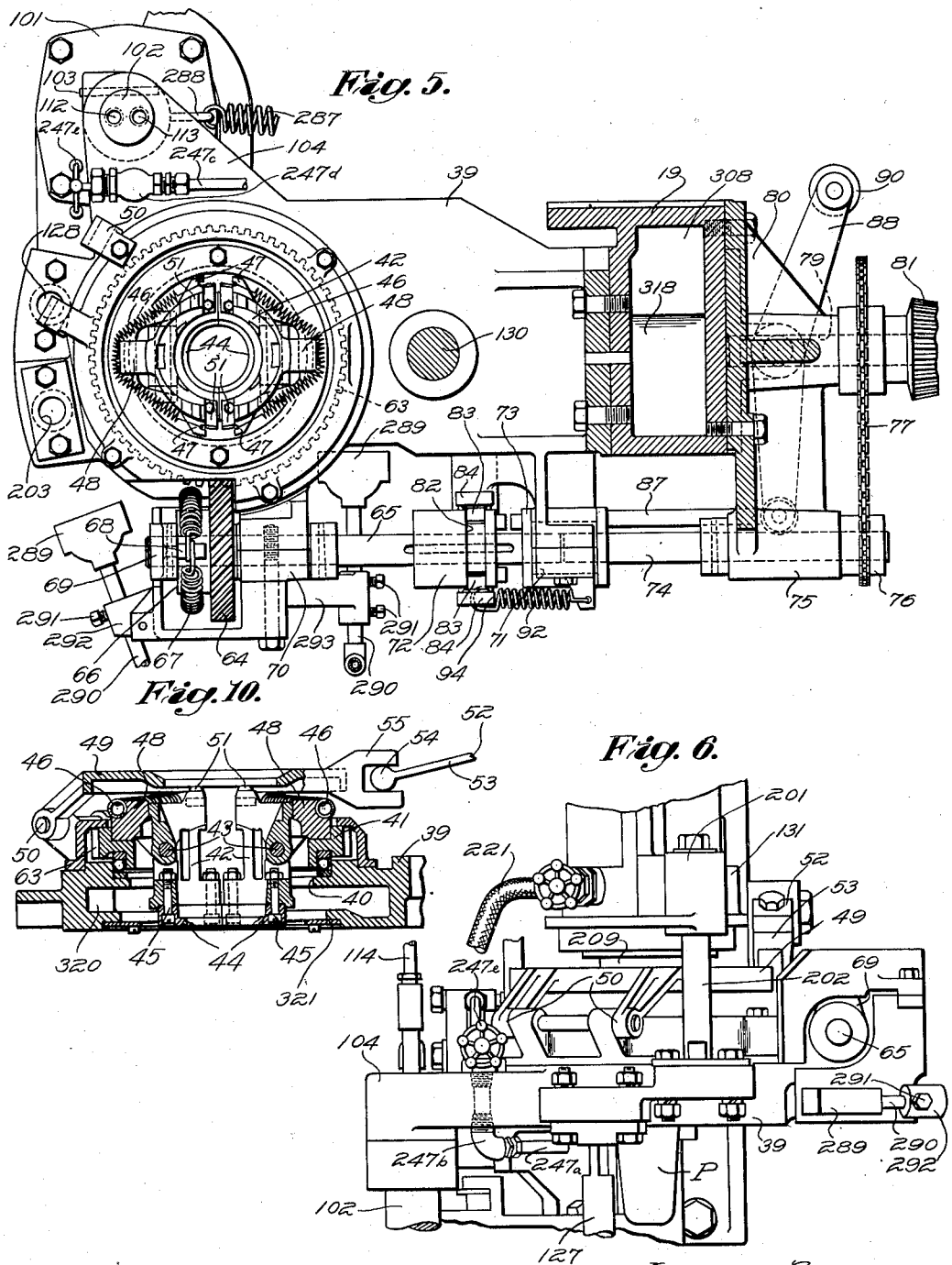

Oct. 30, 1934.  G. E. ROWE  1,979,211
GLASSWARE FORMING APPARATUS
Filed Jan. 3, 1933   8 Sheets-Sheet 5
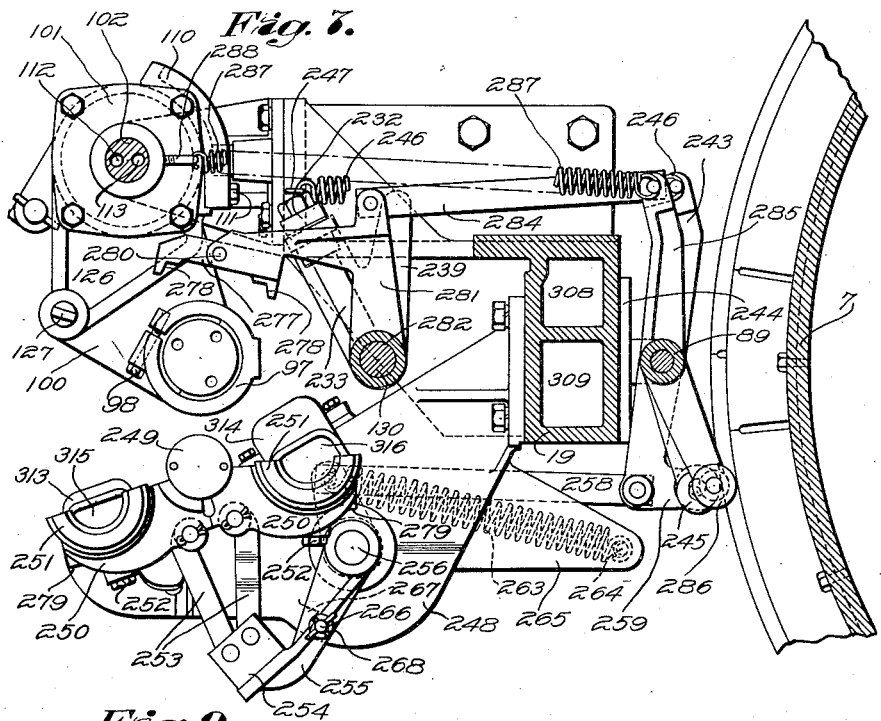
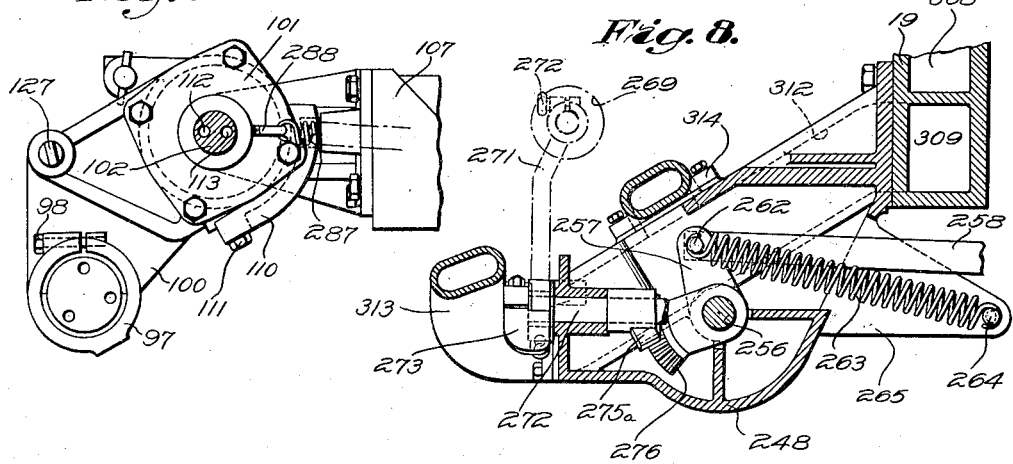
Inventor;
George E. Rowe
by Brown & Parham
Attorneys
Witness;
W. D. Thayer

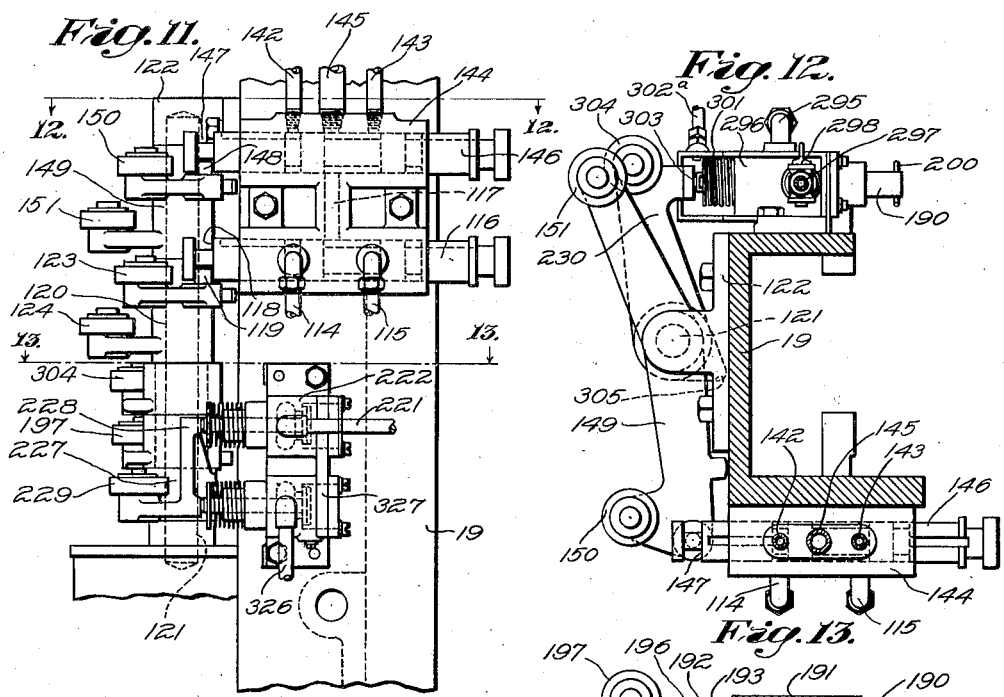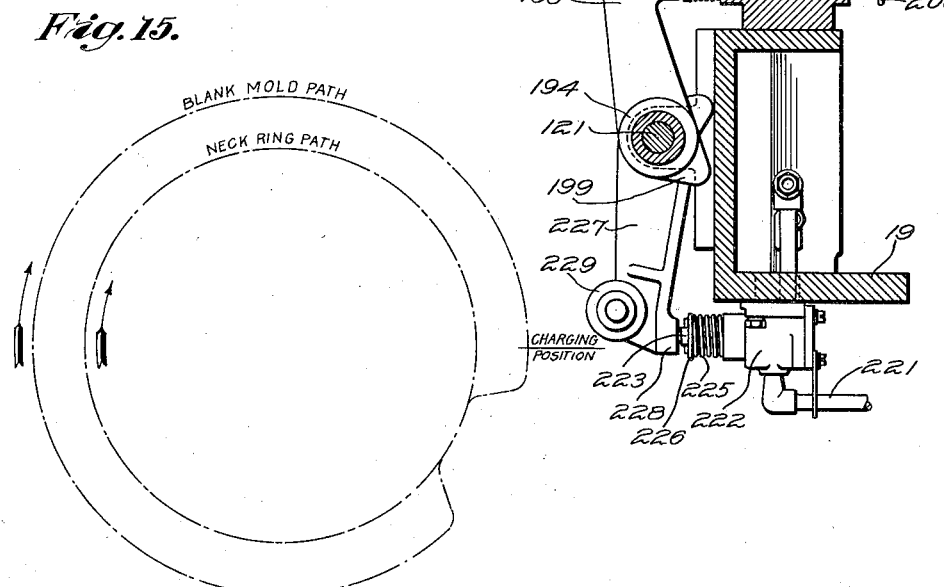

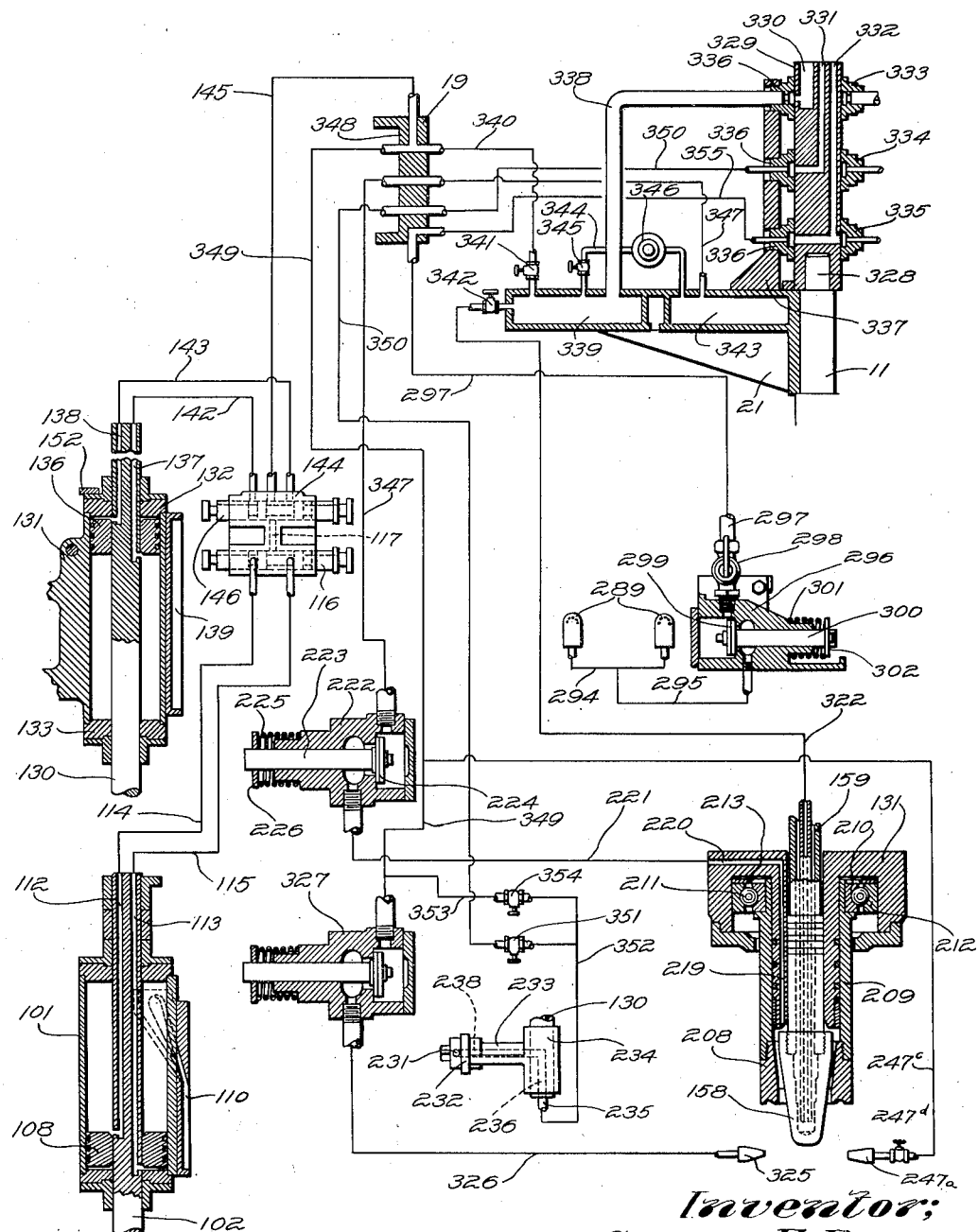

Patented Oct. 30, 1934

1,979,211

UNITED STATES PATENT OFFICE 1,979,211

GLASSWARE FORMING APPARATUS

George E. Rowe, Wethersfield, Conn., assignor to Hartford-Empire Company, Hartford, Conn., a corporation of Delaware Application January 3, 1933, Serial No. 649,839

14 Claims. (Cl. 49—9)

This invention relates to apparatus for forming articles of hollow glassware and more particularly a machine for forming articles of the pressed and blown paste mold or hot mold types. As such, the present invention may be considered as an improvement on the machine disclosed by the patent to Canfield 1,878,465, granted September 20, 1932, for Glassware forming apparatus, although numerous changes in mechanism and certain material and novel improvements have been incorporated in the present machine.

The machine of the Canfield patent above referred to and the present machine are both adapted to the production of paste mold articles, such as bulbs, smooth blown tumblers, etc., by a process which is essentially a "press and blow" process, that is, a process wherein a charge of glass is supplied to a press mold either directly or through a cooperating neck ring. The charge is then pressed by a pressing plunger to form a blank having a neck portion held in a neck ring, which portion is forced thereinto by the displacement of glass from the blank or press mold by the pressing plunger. The plunger is then withdrawn at least part way out of the pressed blank and the blank or press mold is then stripped from about the body portion of the pressed blank. The blank may then be developed in open air while suspended from the neck ring either by puff blowing, or by a low pressure continuous blow. At the same time, the outside of the blank may be reheated to some extent, if desired, by external heat supplying means as a burner. Also, during this period the blank may be rotated if desired. After this open air development, the blank may be enclosed in a blow mold and blown to final form therein. During this final blowing, the blank may, if desired, be continuously or intermittently rotated.

The present machine, unlike the machine of the Canfield patent above referred to, is also adaptable to the production of hot mold tumblers, the process of formation of which is essentially a "press and blow" process and is similar to that above set forth with the exception that the rotation during final blowing in the final blow mold is omitted and also some or all of the open air development between the pressing and final blowing operations may, if desired, be omitted.

Among the general objects of the invention are to provide an improved type of machine which is adaptable to the manufacture of paste mold articles, such as tumblers and which is also adaptable to the manufacture of articles of the same or similar type by what may be termed the "hot mold" process.

A further object of the present invention is to provide various novel improvements both in design and construction over the machine disclosed by the Canfield patent above referred to.

Among the further and more specific objects of the present invention are to provide a machine of the general type shown in the Canfield patent above referred to in which provision is made for the supplying of glass charges, as from an automatic feeder, to the blank molds of the machine while the molds are being continuously moved through a portion of their path at a greater radius from the center of the machine than that portion in which they cooperate respectively with other mechanisms in the positive forming of the glass articles, thus providing, in connection with a machine of the general type shown in the Canfield patent, an easy and practical mode of supplying charges to the blank molds of the machine.

A further object of the present invention is to provide, in connection with a glassware forming machine including a pressing operation and more specifically a pressing and blowing operation, certain novel means for predetermining the effective force tending to move the press follower toward the neck ring and blank mold, so that a greater force is effective on this follower during the pressing operation than is effected thereafter, and in the case of press and blow machines of the paste mold type, a greater force is effective during the pressing operation than is effective during any subsequent blowing operation.

A further object of the present invention is to provide an improved means for effecting the removal of completed articles on the machine by downward movement of the press follower at a speed governed by the speed of opening of the neck ring or chuck.

A further object of the present invention is to provide, in connection with a paste mold machine of the type in which the final blow mold is spaced somewhat below the neck ring or chuck in which the upper portion or lip of the article being formed is gripped, thus leaving an intermediate portion of glass which is exposed out of contact with any mold and may expand freely, for the directing cooling fluid on this exposed portion of the glass for preventing the undue expansion thereof and preventing deformation of the article, such as might be occasioned by a relative twisting action between the upper and lower portions of the article gripped by the neck ring or chuck and enclosed in the blow mold respectively.

Other and more detailed objects of the present invention and advantages of the machine forming the subject matter thereof will become apparent from a reading of the following specification and sub-joined claims when taken in connection with the accompanying drawings in which:

Fig. 2 is a view substantially in vertical section midway through one of the forming units and showing the major portion thereof at a time in the cycle just after the pressing operation has been completed and the pressing plunger retracted;

Fig. 3 is a plan view of one of the forming units with certain of the parts thereof shown diagrammatically in dot and dash outline and certain other parts omitted;

Fig. 4 is a view principally in plan of one of the forming units, such as would be seen looking upon the top portion thereof as shown in Fig. 2, with certain parts in section on the line 4—4 of Fig. 1;

Fig. 5 is a view partially in plan and partially in horizontal section of one of the units, the section being taken substantially on the line 5—5 of Fig. 2, but with the cover member over the neck ring and certain other parts omitted to show the construction of the neck ring and its mounting and rotating means;

Fig. 6 is a fragmentary elevational view showing the neck ring support and particularly the means for controlling the elongation of the blank;

Fig. 7 is a view partially in plan and partially in horizontal section still further down the unit, the section being taken substantially on the line 7—7 in Fig. 2 and the blank mold being omitted, as are also certain other parts for clearness of illustration;

Fig. 8 is a fragmentary view principally in horizontal section through the blow mold supporting housing shown in Fig. 7 and at a lower level than the view in that figure;

Fig. 9 is a view principally in plan and partly in horizontal section of the blank mold actuating cylinder and a portion of the supporting means therefor;

Fig. 10 is a fragmentary view in vertical section taken substantially centrally through the neck ring or chuck and its supporting and operating mechanism;

Fig. 11 is a fragmentary elevational view of certain of the valves and their mounting and operating mechanisms, seen from the opposite side of the unit from that shown in Fig. 1;

Fig. 12 is a view partly in plan and partly in horizontal section substantially on the line 12—12 of Fig. 11;

Fig. 13 is a view partly in plan and partly in horizontal section substantially on the line 13—13 of Fig. 11;

Fig. 14 is a diagrammatic view showing the distributing means for the various fluids used in the machine and showing certain portions of various of the operating mechanisms in vertical section;

Fig. 15 is a diagram showing the blank mold path and the neck ring path during the complete cycle of operation of the machine.

The machine as a whole comprises a base which may be suitably mounted upon wheels (not shown) or in any other desired manner. On the base is formed a central stationary structure, which is generally cylindrical in form and which may be made up of cast parts suitably welded or otherwise secured together and including a solid stationary column at the center. About this central structure is mounted a carrier or turret including upper and lower turret rings connected together by a plurality, in this case twelve, of similar forming units. The rotary structure including the forming units is rotated continuously by suitable driving means and preferably all the operating parts of each unit are controlled in response to the rotation of the rotary turret about the central fixed portion of the machine by the provision upon the central portion of suitable stationary cams which may be adjustable as to position and also interchangeable to provide any desired cycle for the machine. The individual units are so arranged that paste mold articles, such as tumblers, may be formed thereby and also so that iron molds may be used for the production of hot mold articles having relatively thicker walls and formed with the use of a higher blowing pressure and without rotation between the articles and the final blow molds during the final blowing. Suitable forming means are provided in each unit for completely forming articles of the desired type, certain of these means being novel in and of themselves and others being the same as or improvements upon the forming means shown in the Canfield patent above referred to.

Structure of the machine as a whole

Figure 1:
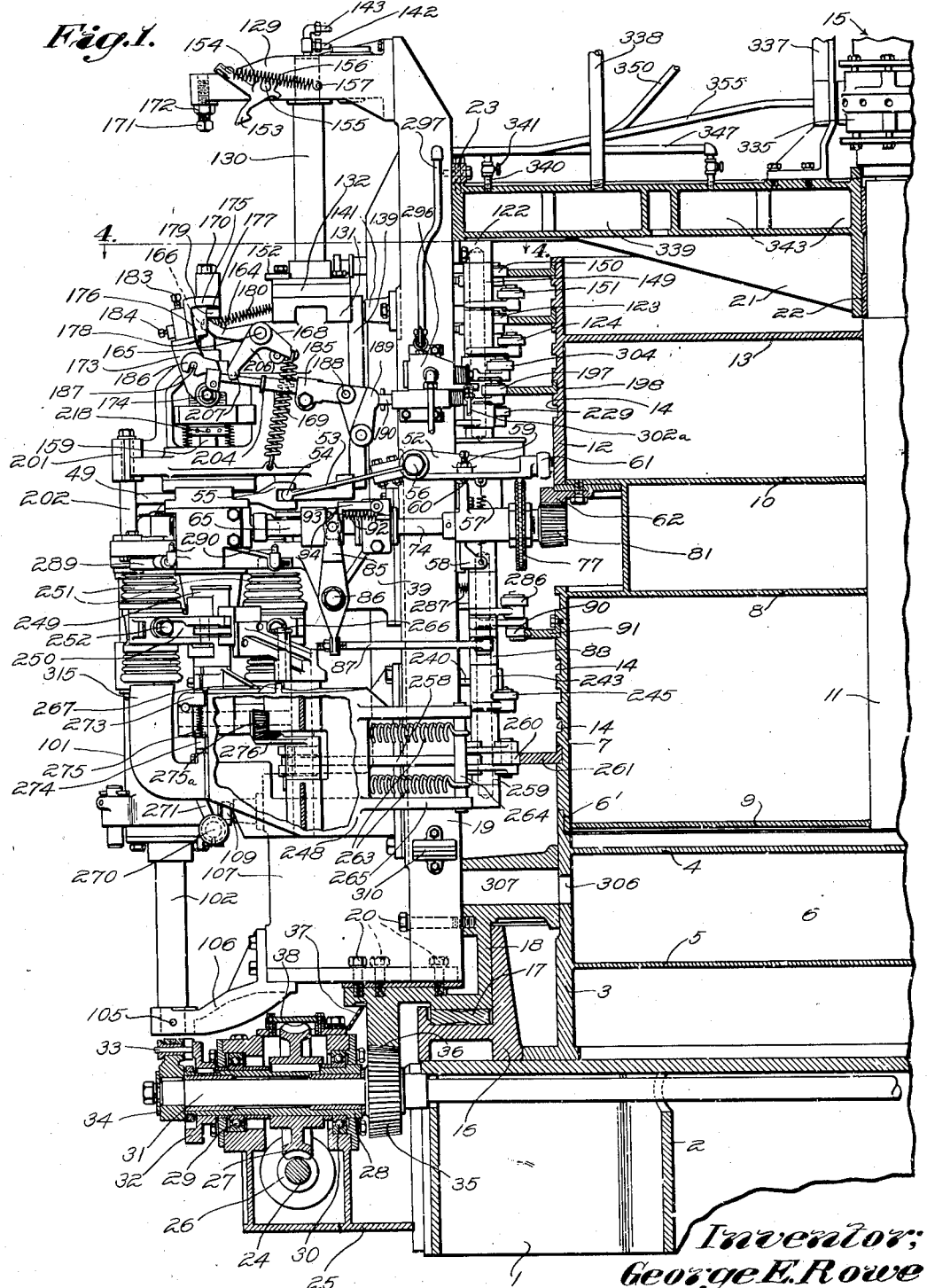
Figure 1 is a view showing the machine from one outer edge substantially to the middle thereof in vertical section with one of the forming units in side elevation, certain parts being broken away to show the interior construction.

Turning now to the particular construction of the machine shown in the accompanying drawings, and referring particularly to Fig. 1 thereof, there is illustrated at 1 the base member which may be formed as a suitable casting and may be strengthened as desired by the provision of suitable ribs as shown at 2. Upon the base 1 is mounted a member 3 which is suitably secured thereto and which is provided with upper and lower webs 4 and 5 formed as substantially horizontal plate-like portions adapted to define a chamber 6 to which cooling wind may be admitted in any desired manner, as through a wind pipe (not shown) leading up through the bottom of the machine. Above the member 3 and suitably secured thereto and positioned therein, as by the interfitting portion 6' is a lower cam drum 7 which is also formed with suitable plate-like portions 8, 9 and 10, to which may be secured a central standard 11 which may be a solid column. As illustrated, the standard 11 is welded to the plate portions 8, 9 and 10, but it will be understood that any desired form of rigid connection may be employed. Suitably secured on the lower cam drum 7 is an upper cam drum 12 provided with an integral or welded plate portion 13 which may also be welded or otherwise suitably secured to the standard 11 so as to form a rigid central supporting structure for the entire machine. The lower and upper cam drums 7 and 12 are provided on their outer peripheries with suitable cam receiving grooves 14 in which may be secured cam members, as illustrated in Fig. 1, these cam members being securable at desired adjusted positions about the grooves 14 and also being interchangeable for other cam members of different shapes.

Above the stationary standard 11 is a fluid distributing device, indicated generally at 15 (Fig. 1), and more particularly illustrated in Fig. 14. The construction and functions of this distributor will be hereinafter described.

About the lower member 3 is positioned a stationary bearing structure 16 annular in form and adapted to support the bearing member 17 between it and a lower turret ring 18. Any suitable type of bearing may be employed as desired, that shown being a hardened oil ring adapted to support the weight of the rotating parts and to minimize friction. The lower turret ring 18 has an inner annular face bearing against the member 16 for positioning the rotating parts of the machine against lateral movement with respect to the fixed parts thereof.

To the lower turret ring 18 are secured the lower ends of each of the plurality of similar forming units which carry the various glassware forming mechanisms, these units comprising frame members or castings 19, secured to the lower turret ring 18 as by bolts 20. There is also provided an upper turret ring generally indicated at 21, Fig. 1, which is mounted for rotation about a bearing portion at the upper end of the column or standard 11, as indicated at 22, and is secured in any desired manner to each of the several units, as indicated at 23.

Means are provided for imparting continuous rotation to the turret and the moving parts thereof. Such means include a suitable prime mover (not shown), which is adapted to drive a horizontal shaft 24 continuously for the time the machine is to be operated. In the usual case, a suitable clutch (not shown) of any desired type will be provided between the prime mover and the shaft 24 in order to throw the machine out of operation when desired. The shaft 24 is suitably journaled in an extended bracket member 25 secured to the base 1 and carries secured thereto a worm 26 meshing with a worm wheel 27 suitably keyed to a sleeve 28 which is rotatably mounted in ball bearings 29 and 30 in web portions of the bracket member 25. The sleeve 28 is mounted for free rotary movement upon a central shaft 31 and carries at its outer end a collar member 32 which is connected by a shearing pin 33 to a member 34 which is secured to the shaft 31. At its inner end the shaft 31 carries a bevel pinion 35 which meshes with an annular ring gear 36 which may be formed as an annular series of gear teeth cut in a flange portion of the lower turret ring 18. Thus, driving power will be imparted from the shaft 24 to rotate the lower turret ring 18 and thereby to rotate the several forming units and the upper turret ring 21 which are rigid therewith. In the event that some obstruction should be encountered by the machine which might cause breakage of parts thereof, or in the event of any other type of overload upon the drive, the shearing pin 33 will be broken, thus permitting continued rotation of the drive shaft 24 and rotation of the sleeve 28 with respect to the shaft 31. Suitable dust guards 37 and 38 may be provided if desired for preventing ingress of foreign material into the gears making up the main drive.

*Neck ring and associated mechanism and operation thereof*

Secured to the main frame of each unit substantially midway of the height thereof is a neck ring supporting bracket or shelf 39 which may be a suitably shaped casting. The bracket or shelf 39 carries the lower raceway 40 (Figs. 2 and 10) of a ball bearing upon which the rotary neck ring support 41 is mounted. A pair of neck ring carriers 42 are mounted upon spaced horizontal pivots 43 in opposite sides of the neck ring support 41 and carry the neck ring or chuck portions 44 bolted or otherwise suitably secured thereto as at 45. Thus the neck rings or chucks may be opened and closed by movement of their carriers 42 about the pivots 43.

For closing the neck rings there is provided resilient means including springs 46, each of which is connected at its opposite ends to hooks 47 at the opposite ends of one of the neck ring carriers 42, the mid portions of each of the springs 46 extending about suitable lugs 48 rigid with the neck ring support 41. Thus the tension of the springs 46 will tend at all times to rotate the neck ring carriers 42 about their pivots 43 in a direction to move the neck ring portions 44 to closed position.

Means are provided for opening the neck ring portions when desired for the release of completed articles, preferably in response to the rotation of the turret. This means includes a cover member 49 (Figs. 2 and 10) which is pivoted as at 50 to suitable brackets extending from the neck ring bracket or shelf 39. The neck ring carriers 42 are each provided at their opposite end portions with upstanding lugs 51, seen best in Fig. 10, which abut against the under side of the cover member 49. Thus when the cover member 49 is moved downwardly about its pivot 50, it will force the lugs 51 downward and thereby swing the neck ring carriers 42 on their pivots 43 to open the neck ring against the tension of the springs 46.

Means are provided for moving the cover 49 in either direction, including a lever 52 (Figs. 1 and 10), one arm 53 of which is provided with a ball or cylindrically shaped end 54 which is received within a bifurcated extension 55 of the cover plate 46. The lever 52 is continually urged clockwise about its pivot 56 as seen in Fig. 1 by a tension spring 57 extending between one arm of the lever and a suitable fixed anchorage shown as a bracket 58 secured to the frame casting 19 of the unit. The pivot 56 is formed as a stud extending from the frame casting 19 of the unit. The upper position of the cover 49 is adjustably determined by a stop screw 59 threaded through one arm of the lever 52 and suitably locked in adjusted position, this screw being adapted to abut against a suitable fixed shoulder portion 60 of a bracket rigid with the frame casting 19 of the unit. For rocking the lever 52 on its pivot 56 to lower the cover portion 46 and thereby to open the neck ring or chuck, the lever 52 is provided at its right hand end, as seen in Fig. 1, with a cam roller 61 which is adapted to engage a cam (not shown) secured to the upper side of a ring gear 62, later to be described, which is in turn secured to the central stationary frame of the machine. The arm 53 of the lever 52 is formed as a leaf spring in order that the force imparted to the cover plate 46 be resilient, so that in the event that the neck ring should not be opened easily, no parts will be broken upon the roller 61 riding up on its associated cam. Thus the opening of the neck ring 44 is caused by the rotation of the turret in response to the roller 61 riding up on a high portion of its associated cam.

Means are also provided for rotating the neck ring when desired. For this purpose the neck ring support 41 is provided on its outer periphery with spiral gear teeth 63 (Figs. 5 and 10) which mesh with complementary teeth upon a spiral gear 64 freely mounted upon a drive shaft 65. The gear 64 is provided with an extended hub portion 66 which may be integral therewith and about which is stretched a tension spring 67, the ends of the spring being secured to a pin 68 carried by a bracket 69 secured to the shaft 65. Thus there is provided a yielding drive between the shaft 65 and the gear 64 and hence with the neck ring and its carrying members. This arrangement compensates for any possible obstruction which may interfere with the rotation of the neck ring and glass carried thereby when the shaft 65 is positively driven and prevents a possible breakage of the parts.

The shaft 65 is journaled in a bearing 70 and carries splined thereto a clutch member 72 which cooperates with a complementary clutch member 73 rigidly secured to a shaft 74 positioned in alignment with the shaft 65. As shown (Fig. 5), the right hand end of the shaft 65 may be journaled within a suitable collar carrying the clutch member 73 and this collar in turn journaled within a bearing member 71. At the right, as seen in Fig. 5, the shaft 74 is journaled in a bearing 75 and carries inwardly of this bearing a sprocket wheel 76 about which passes a sprocket chain 77. The sprocket chain 77 also passes about a sprocket wheel 78 (see also Figs. 1 and 2) which is suitably keyed to a shaft 79 swively mounted in a bracket 80 secured to the frame member 19 of the unit. The shaft 79 carries at its inner end a beveled pinion 81 which is adapted to mesh with the ring gear 62 (Fig. 1) rigid with the central frame structure of the machine. Thus as the turret carrying the forming units rotates about the center structure of the machine, rotation will be imparted to the beveled pinion 81 and thence through the sprocket chain 77 to the shaft 74. This shaft will drive the shaft 65 through the clutch elements 73 and 72, the shaft 65 in turn driving the spiral gear 64 through the friction drive above described, and that gear serving to rotate the neck ring.

The clutch member 72 (Fig. 5) is provided with an annular groove 82 in which is received a pair of pins 83 extending inward from the upper bifurcated end 84 of the lever 85 (Fig. 1). The lever 85 is pivoted as at 86 to the neck ring shelf or bracket 39 and is provided at its lower end with an eyelet opening through which extends one end of a link 87, the other end of which is pivoted to a rocker member 88 journaled upon a rocker shaft 89 (Fig. 2). The rocker member 88 carries on the end of one of its arms a cam roller 90, which is positioned to cooperate with a suitable cam 91 (Fig. 1) positioned in one of the cam grooves 14 of the lower cam drum 7. The link 87 is provided at the left of the lower arm of the lever 85 with a suitable stop nut secured thereto so that it is adapted to move the lever about its pivot 86 in a counterclockwise direction only, as seen in Fig. 1, in response to the cam roller 90 riding up upon a high part of the cam 91. A suitable tension spring 92 is connected between the upper end of the lever 85 and a suitable fixed anchorage for urging the cam roller 90 against its associated cam and for moving the clutch members 72 and 73 into engagement when such action is permitted by the configuration of the cam 91. Thus the cam 91 serves positively to move the clutch members 72 and 73 out of engagement with one another and the spring 92 serves to cause the engagement of these members when permitted.

When it is desired to lock the clutch members 72 and 73 out of engagement, this may be accomplished by manually moving a latch 93 to the position shown in Fig. 1 to engage behind a suitable shoulder 94 formed on the upper end of the lever 85 and hold this lever in the position shown in that figure against the tension of the spring 92. This latch member 93 is pivotally mounted upon a suitably fixed part of the bearing 71 and is adapted for manual operation only.

Thus the neck ring may be rotated or maintained stationary as desired in response to the rotation of the turret under control of the cam 91, which is adjustably positioned on the lower cam drum 7.

*Blank mold and associated mechanism-operating means therefor*

As stated above, there is provided for each forming unit a blank mold to which charges of glass are supplied and which operates thereafter in the pressing of the glass to form a blank of the desired shape. As shown in the accompanying drawings, particularly Fig. 2, there is provided a blank mold 95 which is preferably a one-piece mold and may be formed as an iron mold as illustrated in Fig. 2, or, if desired, may be of the type shown and described in the Canfield Patent 1,625,590, granted April 19, 1927. The mold 95 is provided with a cylindrical base portion 96 which is adapted to be received in a suitable socket formed in a member 97 (Figs. 2, 7 and 9). A part of the side walls of the member 97 are split and are adapted loosely to receive the base portion 96 of the blank mold when sprung apart and to be moved toward one another to grip this portion. Suitable means including the clamping bolt 98 are provided for moving the portions of the member 97 toward one another to grip the base portion 96 of the blank mold therein.

The member 97 is suitably secured as by bolts 99 (Fig. 2) to a laterally extending arm 100 which may be integral with a pneumatic cylinder 101. The ends of the cylinder 101 are slidably mounted upon a vertical shaft or standard 102, the upper end of which is suitably secured as by a pin 103, Fig. 5, in a lateral extension 104 from the neck ring shelf or bracket 39. The lower end of the shaft or standard 102 is suitably secured as by a pin 105 (Fig. 1) in a bracket 106 secured to an extension 107 of the unit frame member 19.

Rigidly carried upon the shaft or standard 102 within the cylinder 101 is a piston 108 (Fig. 2). Thus by admitting and exhausting pressure to the interior of the cylinder 101 on opposite sides of the piston 108 therein, the cylinder may be raised and lowered to raise and lower the blank mold.

It is further desired that there be a lateral movement of the blank mold in conjunction with and preferably resulting from this vertical movement. For this purpose the extension 107 of the unit frame is provided with a cam roller 109 (Figs. 1 and 2), which is adapted to be received in a suitably shaped cam groove in a member 110 (Figs. 2 and 7) rigidly secured to the cylinder 101, as by bolts 111. The cam groove in the member 110 is shaped so that upper range of the movement of the blank mold will be vertical, so that it will approach and recede from a position in cooperation with the neck ring in a vertical direction. The lower range of this movement is preferably one that will rotate the cylinder 101 about the shaft 102 causing a helical movement of the blank mold and thus moving it from an inner radius position to an outer radius position with respect to the entire machine. The horizontal components of the path of the blank mold as a result of its inward and outward movement are illustrated in Fig. 15 in relation to the path of the neck ring which is a true circle about the center of the machine.

Means are provided for supplying fluid pressure to the interior of the cylinder 101 on opposite sides of the piston 108 therein. For this purpose the shaft 102 is provided with a pair of longitudinal bores 112 and 113 communicating with the space above and below the piston 108 respectively through lateral ports (Figs. 2 and 14). At their upper ends the bores 112 and 113 are connected by pipes 114 and 115 respectively (Figs. 4 and 5) with a valve best seen in Fig. 11. This valve is of the piston type and includes a piston 116 slidably mounted therein. Pressure is constantly admitted to the valve through a passage 117 from a source hereinafter to be described. For operating the valve, the stem or piston 116 thereof is provided with an annular groove 118 in which is received a pin 119 extending upward from a suitable rocker member 120 pivoted upon a stationary rocker shaft 121. The shaft 121 is suitably received in recesses in an upper bracket 122 (Figs. 1, 2 and 11) which is secured to the frame member 19 of the unit and in the bracket 80 which is also secured to the frame member 19. The rocker member 120 is provided with a pair of oppositely directed arms at the outer ends of which are mounted cam rollers 123 and 124 cooperating with a pair of complementary cams secured to the upper cam drum 12 as illustrated in Fig. 1. By providing two cam rollers and properly shaped complementary cams, the movements of the rocker member 120 and therefore of the valve piston 116 will be positive in both directions. The internal construction of the valve 116 is conventional and need not be described beyond saying that pressure is admitted to the center portion thereof between a pair of spaced piston portions and the piston member is so movable as to admit pressure to one of the lines 114 or 115 while exhausting pressure from the other of these lines and vice versa.

Thus the blank mold is movable between two positions one of which is located at a greater radius from the center than the other and also at a lower level and in a path such that its approach and recession from the second named position will be in a vertical direction so that a one-piece blank mold, such as is illustrated, may be stripped from the partially formed glass articles P which have been shaped in that mold by a pressing operation later to be described. The blank mold is adapted to be charged with glass at its lower outermost position at which access may be had thereto for supplying the charges while the mold is being continuously moved due to the continuous rotation of the turret of the machine.

For positioning the blank mold at its uppermost position in connection with the neck ring, the cylinder 101 is provided with a suitable rigid or integral extension 126 (Fig. 2) in which is rigidly mounted a centering pin 127. This pin is adapted to be received in a suitable hole best seen at 128 (Figs. 5 and 6) in a piece positioned rigidly with respect to the neck ring bracket or shelf 39. The registration of the pin 127 with the hole 128 positively positions the blank mold in lateral directions with respect to the neck ring or chuck, so as accurately to register these parts for the formation of properly shaped glass articles. It is contemplated in this connection that ordinary press and blow ware, such as jars, might be made upon this machine, and that for this purpose accurate registration between the blank and neck molds is provided.

*Press and blow head, associated mechanism and operating means therefor*

Associated with each unit of the machine is a head adapted first to be used in pressing a charge of glass and thereafter to be employed in supplying blowing pressure to the interior of the pressed glass to blow it to final form. Suitable means are provided in connection with this head for causing it to carry out all the necessary operations to achieve the desired results.

Mounted on the upper end of the frame 19 of each unit is a laterally extending bracket 129 (Figs. 1 and 3). Extending from this bracket downward through the neck ring bracket or shelf 39 is a fixed shaft or column 130 which is suitably secured in stationary position. Mounted in sliding arrangement on the shaft 130 is a pneumatic cylinder formed in a main casting 131 and having upper and lower heads 132 and 133 respectively (Fig. 2), the heads being suitably bolted to the casting 131. Means are provided for preventing flow of air pressure outwardly along the shaft 130 through the heads 132 and 133, such means including piston rings 134 suitably secured in recesses in these heads and moved to positions closely to engage the shaft 130 by tension springs 135 therearound. Within the cylinder formed in casting 131 is received a suitable stationary piston 136 rigidly mounted upon the shaft 130. Air pressure is admissible to the interior of the cylinder formed in the casting 131 at opposite sides of the piston 136 through a pair of longitudinal bores 137 and 138 (Figs. 2, 3 and 4), these bores communicating respectively with the spaces below and above the piston 136 within the cylinder as seen in Fig. 14.

The casting 131 and parts carried thereby are guided for solely vertical movement by means of a cam groove formed in a member 139 secured to the casting 131 (Figs. 2 and 4), with which cooperates a cam roller 140 mounted in a suitable bracket 141 rigid with the main frame member 19 of the units. The limits of the vertical movement of the casting 131 are determined by engagement of the heads 132 and 133 with portions of the upper bracket 129 and neck ring bracket 39 respectively.

Means are provided for admitting fluid pressure to the opposite sides of the piston 136 within the cylinder in casting 130, such means including a pair of pressure lines 142 and 143 shown diagrammatically by dot and dash lines in Fig. 3 and also shown in Fig. 14. These lines communicate at their opposite ends with a piston valve 144 secured to the main frame member 19 of the unit and similar to the valve used for controlling the admission and exhaust of pressure to the blank mold carrying cylinder 101. As seen in Fig. 11, pressure is continuously supplied to the piston valve 144 through a central pipe 145, in a manner later to be described, and thence passes to the central chamber of this valve and also through the passage 117 to the central chamber of the valve controlling the admission and exhaust of pressure to the blank mold cylinder 101. The valve 144 is provided with a movable piston member 146 of conventional type which has formed therein adjacent to one end an annular groove 147 in which is received a suitable pin 148 extending from a rocker member 149 journaled upon the rocker shaft 121. The rocker member 149 carries, preferably integral therewith, a pair of arms at the outer ends of which are mounted cam rollers 150 and 151, which cooperate with a pair of complementary cams secured to the upper two grooves in the upper cam drum 12 as seen in Fig. 1. Thus by providing properly shaped cams, the piston 146 of the valve 144 may be positively moved in both directions positively to control the admission and exhaust of pressure from the opposite sides of the piston 136 in the cylinder formed within the casting 131 and thereby positively to control the movements of this cylinder.

Means are provided for holding the cylinder including casting 131 at its uppermost or inoperative position when desired in order to provide for the making of any necessary adjustments to portions of the machine at such time, for example, as when power including pneumatic pressure may be shut off. For this purpose the upper head 132 of the cylinder is provided with a bracket member 152 (Fig. 1) which is adapted to cooperate with a suitable hook 153 formed on one end of a bell crank lever 154 pivoted at 155 to the upper bracket 129. Another arm of this bell crank lever is connected by a tension spring 156 to a suitable anchorage 157 on the upper bracket 129. The parts are so arranged in regard to the position of the anchorage 157 and the arm to which the movable end of spring 156 is connected with respect to the position of the pivot 155 to provide for an overcenter throw of the lever 154, so that it may be resiliently held in either of its terminal positions against stops (not shown). The movement of the lever 154 between its two terminal positions is preferably accomplished manually whenever it is desired to lock the cylinder casting 131 and the press and blow head carried thereby in its uppermost position or to release this head. The hook 153 of the member 154 as shown in Fig. 1 in its inoperative position which it will normally occupy during the automatic operation of the machine and in which the hook will not engage under the shoulder formed by the member 152.

The casting 131 is adapted to carry a pressing plunger used in pressing the glass in a blank mold. As shown there is provided a pressing plunger 158 (Figs. 2 and 14) formed as a head threaded onto a plunger stem or sleeve member 159. The plunger head 158 is made removable so as to permit the substitution of plungers of different shapes. The hollow sleeve member or plunger stem 159 is mounted for sliding movement in a tubular downward extension 160 which may be integral with the casting 131. As shown, the plunger stem 159 is provided with a plurality of piston rings to form an air-tight sliding contact with the extension 160. Adjacent to the upper end of the casting 131 and in an arm 161 thereof is a bushing member 162 preferably rigid with the arm 161. Mounted in the bushing 162 for free sliding movement is a hollow sleeve 163 which in turn serves as a bearing for the plunger stem 159, permitting the free vertical movement of the latter therein. The plunger 158 and its stem 159 are thus adapted for vertical movement with respect to the casting 131 by means later to be described as well as to be moved thereby.

Means are provided for continuously urging the plunger 158 upwardly with respect to the casting 131. Such means include a member generally indicated at 164 (Figs. 1 to 4 inclusive). The member 164 is pivoted at 165 on a horizontal axis to the casting 131 and is provided with a pair of rounded end hook members 166 (Figs. 1 and 4) which are received under a squared head 167, which is rigidly mounted upon the stem 159 of the pressing plunger. The member 164 is also provided with an arm 168 connected by a tension spring 169 with a fixed anchorage on the casting 131. Thus the tension of the spring 169 always tends to rotate the member 164 clockwise (as seen in Fig. 1) about its pivot 165, which in turn serves through the hook members 166 to urge the plunger upwardly with respect to the casting 131.

Prior to the pressing operation it is desired to move the pressing plunger to a lower position with respect to the casting 131 and there to retain it for the pressing operation. This relative downward movement of the plunger with respect to the casting 131 is accomplished by and in response to the upward movement of the casting 131, due to the admission of pressure between the upper head 132 of the cylinder formed therein and the piston 136. Upon movement of the casting 131 upwardly, the upper end of the block 167, which carries the bolt member 170, contacts with an adjustable stop bolt 171 (Fig. 1) threaded into the upper bracket 129 and secured in a desired adjusted position by the jamb nut 172. This will cause a downward movement of the pressing plunger with respect to the casting 131 against the tension of the spring 169.

It is also necessary to provide for the locking of the plunger in a lowered position with respect to the casting 131, after this lowering movement has been effected as above set forth and in order to prevent the upward return of the plunger by the spring 169 upon downward movement of the casting 131. This is accomplished by means of a latch yoke member 173 which is pivoted at 174 to depending portions of the arm 161 of the casting 131 for movement about a horizontal axis. The member 173 is provided with a pair of sector shaped portions 175 rigid therewith which engage the opposite sides of the block 167 and prevent its rotation and thus prevent the rotation of the plunger 158 as seen in Figs. 3 and 4. The under surfaces of the portions 175 are also provided with extensions 176 forming a pair of downwardly directed shoulder portions 177 and 178 either of which may cooperate with bosses 179 extending laterally from the head 167. Thus in the position of the parts shown in Figs. 1 and 2 in which the plunger is raised, the bosses 179 are engaged beneath the shoulders 177, thus preventing further upward movement of the plunger due to the tension of spring 169 acting through the member 164. When the plunger is moved to its lowermost position with respect to the casting 131, the latch member 173 is moved clockwise about its pivots 174 through the action of the tension spring 180 extending between this member and a suitable anchorage 181 (Fig. 4) on the cylinder head 132 so as to engage the shoulders 178 over the bosses 179, thus retaining the plunger in its lowermost position.

If it is desired adjustably to control the lowermost position of the plunger, such position thereof may be determined by the engagement between a laterally extending boss 182 on the head 167 (Figs. 2 and 4) and an adjustable set screw 183 threaded in the member 173 and locked in adjusted position by a second set screw 184. Thus if the stop screw 171, which is threaded in the upper bracket 129 (Fig. 1), be adjusted to such a position as to give a slight additional throw to the downward movement of the plunger upon upward movement of the cylinder with respect to its fixed piston 136, the plunger may be moved down so that the lug 182 will be below the lower end of the screw 183, so that when the cylinder and plunger are again moved down as a unit, the plunger will be moved back through the action of the tension spring 169 until the upper side of the lug 182 engages the set screw 183, thus adjustably determining the lowermost position of the plunger.

Means are provided for releasing the latch member 173 to permit the upward movement of the plunger from its lower position which it occupies during the pressing operation to its upper position, shown in Figs. 1 and 2, which it occupies during the reheating of the glass and the final blowing. Such means in this instance includes a link member generally indicated at 185 (Figs. 1, 3 and 4), one end of which is provided with a hook 186 adapted to engage over a pin 187 on the member 173 at one end and pivoted at 188 to a rocker lever 189 at its opposite end. The lever 189 is pivoted on a horizontal shaft extending from the cam member 139 (Fig. 4) and is adapted at the lower position of the casting 131 to have a portion in alignment with an actuating pin 190 (Figs. 1 and 13). The pin 190 is mounted for horizontal sliding movement in a bearing member 191 rigidly secured to the main frame casting 19 of the unit. Surrounding one end of the pin 190 between the bearing member and a head 192 on the pin is a compression spring 193 tending to move the pin to the left as seen in Fig. 13. Cooperating with the pin 190 is a rocker member 194 mounted as hereinafter set forth upon the rocker shaft 121 (Figs. 1 and 2). This rocker member includes an arm 195 having a portion 196 adapted to engage the end of the pin 190 and also having mounted thereon a cam roller 197 which is adapted to engage a suitable cam 198 (Fig. 1) secured in one of the cam grooves 14 of the upper cam drum 12. The spring 193 tends at all times to move the pin 190 to the left (as seen in Fig. 13) and to retain the cam roller 197 against its associated cam. Excessive movement in this direction, however, in the event that a complete cam is not provided, is prevented by a stop lug 199 preferably integral with the rocker member 194 and adapted to contact with the inner face of the main frame casting 19. Excessive movement of the pin 190 may also be provided against by a cross pin 200 rigidly mounted therein.

The operation of the plunger and its mechanism thus far described is as follows: Starting with the plunger in its upper position as shown in Fig. 2, the plunger is constantly urged upwardly by the tension spring 169 acting through the member 164 and the hook portions 166 thereof engaging beneath the head 167 of the plunger. At the same time upward movement beyond a certain point is prevented by the lugs 179 on the plunger head 167 engaging beneath the shoulders 177 of the portions 175 of the member 173. This position of the plunger continues beyond the time at which the article is removed from the neck ring and from the machine. Before starting upon the formation of the next succeeding article in the unit, the press and blow head carried by member 131 is moved upwardly by the admission of pressure between the piston 136 and the upper cylinder head 132 which is accomplished by means of the cams operating the valve 144. Upon the engagement of the stud 170 with the stop bolt 171 adjacent to the top of the cylinder movement, the continued upward movement of the cylinder will cause downward movement of the plunger with respect thereto against the tension of the spring 169. When the plunger has been moved sufficiently, the member 173 is moved clockwise, as seen in Figs. 1 and 2, about its pivots 174 under the action of the tension spring 180, so that the shoulders 178 of the portion 176 ride over the lugs 179 and also the screw 183 rides over the boss 182, thus preventing the relative upward movement of the plunger upon the subsequent downward movement of the cylinder by which it is carried. However, at the initiation of the downward movement of the cylinder there may be a very slight upward movement of the plunger with respect thereto until either the lugs 179 engage the shoulders 178 or the boss 182 engages the lower end of screw 183, whichever happens first.

The plunger and press and blow head are now carried downward as a unit through the action of the cylinder formed in the casting 131 to press the article in the blank mold 95, which has by this time been raised into cooperative relation with the neck ring or chuck and which contains a charge of glass ready for formation.

The lower lateral position of the pressing plunger is accurately predetermined by providing on the casting 131 an extension 201 (Figs. 1, 3, 4 and 6) in which is secured a centering pin 202 adapted to seat in the centering aperture 203 in the neck ring shelf 39 (Fig. 5).

After the pressing operation has been completed and it is desired to raise and strip the plunger out of contact with the pressed glass, the cam roller 197 (Figs. 1 and 2) rides up upon a high part of the cam 198 thus causing a movement of the pin 190 to the left, as seen in Fig. 1, which rocks the lever 189 counterclockwise about its pivot and pushes the link 185 to move the latch yoke member 173 counterclockwise about its pivots 174 to the position shown in Fig. 1, thus permitting the upward movement of the plunger under the action of the tension spring 169.

In some instances, however, the plunger 158 may have a tendency to stick and adhere to some extent to the glass, so as to make the stripping uncertain, so that if resilient means only were provided for accomplishing this stripping operation, it might not always be completed at the desired time in the machine cycle. In order to make the stripping operation more positive, therefore, in the event that the resilient means including this spring 169 fail to accomplish the desired stripping action by moving the plunger upwardly, positive means are provided for moving it upwardly by the use of a positively applied mechanical force. For this purpose the link 185 (Figs. 1, 3 and 4) is provided with an adjustable collar portion 204 which may be secured in adjusted position thereon by a clamp screw 205. The member 164 is provided with an arm 206 having its lower end 207 bifurcated (Figs. 3 and 4) and surrounding a reduced portion of the link 185. If the plunger sticks in its lowermost position, the member 164 will be located in its furthest counterclockwise position (as seen in Fig. 1) so that the bifurcated end 207 which surrounds the reduced portion of the link 185 will be at its furthest right hand position and near the end of the collar portion 204 of that link. Thus when the link 185 is positively moved to the left to move the latch member 173 to the left as seen in Figs. 1 and 2, the collar portion 204 will engage the bifurcated end portion 207 of the arm 206 which is rigid with the member 164 and will positively move the member 164 in a clockwise direction by its pivot 165, thus positively forcing the plunger upwardly through the engagement of the rounded hook members 166 beneath the squared head 167 of the plunger stem.

The lower end of the press and blow head is provided with a press follower which cooperates with the neck ring or chuck in forming the neck portion or lip of the article to be formed. As shown in the accompanying drawings, a follower of this character is indicated at 208 (Figs. 2 and 14). This follower is removably secured as by screw threads to a sleeve 209 rotatably mounted about the cylindrical sleeve-like extension 160 of the casting 131. The removable arrangement of the follower 208 with respect to its carrying sleeve 209 permits the substitution of differently shaped followers for forming articles of different shapes. Means are provided about the extension 160 for preventing upward passage of air between it and the sleeve 209, such means including a plurality of piston rings. The sleeve 209, and the follower member 208, are mounted for free rotation and also free vertical sliding movement upon the extension 160. At its upper end, the sleeve 209 carries the inner raceway 210 for ball bearings 211, the outer raceway 212 of which is mounted for vertical sliding movement in an open cylinder formed within the casting 131. Thus when the follower 208 is moved downwardly into engagement with the neck ring or chuck and the latter is rotated, the follower and its sleeve will also be rotated, due to rotation of the neck ring or chuck and its carrier parts, such rotation being permitted by the ball bearing including raceways 210 and 211 and balls 212.

Resting on the outer raceway 212 is a plate member 213 which is adapted to receive the lower ends of a plurality of compression springs 214. The upper ends of springs 214 are mounted in suitable recesses in a spring plate 215 which is arranged for vertical movement with respect to stem 159 of the plunger and is prevented from rotating by the provision rigidly therewith of a pair of lugs 216 loosely embracing the opposite sides of a portion of the casting 131. As shown in the drawings, the spring plate 215 is threaded on a sleeve member 217 which is freely mounted on the plunger stem 159. Suitable radial holes 218 are provided in the member 217 for the reception of a tool for rotating it with respect to the spring plate 215 for adjusting the tension of the springs 214. The upper portion of the member 217 is provided with an annular rabbet in which is seated the lower end of the sliding sleeve 163.

The springs 214 are of two kinds, there being a plurality of each kind disposed in equi-spaced relation about the plunger stem. In the present machine there are two springs of each kind, one pair comprising relatively heavy and relatively short springs extending between the spring plate 215 and the plate 213 and effective primarily for the purpose of determining the relatively heavy pressure exerted downwardly on the follower during the pressing operation, and the other pair, which are not clearly shown in the accompanying drawings, comprising relatively lighter and relatively longer springs than the heavy springs first described. These latter springs operate to some extent to augment the heavy pressure exerted during the pressing operation, but their primary purpose is to serve as a measure of the downward pressure exerted on the follower 208 after the plunger has been stripped from the glass by the upward movement above described and pressure upon the heavy springs has been completely relieved. In the position of the parts shown in Fig. 2, the lengths of the heavy springs 214 there shown is such that these springs are preferably under no compression except that due to the weight of the spring plate 215, the member 217 and the sleeve 163. The light springs, however, are under a predetermined light compression due to the fact that the upper end of the member 217 is at this time in engagement with the under surface of the bushing 162.

The operation of these parts is as follows: Starting with the press and blow head and associated mechanisms in the position shown in Fig. 2, which position is the same as that at which the articles are removed from the neck ring, the first action in the preparation for the formation of the next succeeding article is the upward movement of the cylinder formed in the casting 131. At this time, and as above stated, the plunger is moved downwardly with respect to the casting 131 due to the engagement of the stud 170 with the stop screw 171. This causes the counterclockwise movement of the member 164 upon its pivot, as seen in the drawings, which causes the rounded hook members 166 to move downward. These members not only engage the under side of the head 167 of the plunger, but also are adapted to engage the upper surface of the sleeve member 163 and to move it downwardly a predetermined distance. Downward movement of this member 163 determines the lower position of the spring plate 215. The heavy pair of springs 214 are moved down and transmit force to the plate 213 and the outer raceway 212 and thence through the ball bearing to the sleeve 209 and to the press follower 208. When the ball bearing raceways 210 and 212 seat against the lower end of the cylinder in which they are received, the follower 208 is at its lowermost position with respect to the casting 131. Upon downward movement of the casting 131 carrying the press and blow head therewith, the follower 208 will first seat upon the neck ring or chuck 44 which will prevent further downward movement of the press follower 208. Further downward movement of the press and blow head will cause the compression of springs 214 thus providing a predetermined relatively heavy pressure downward upon the member 208 for and during the pressing operation.

It is desired, however, to relieve this pressure during the subsequent operations as it might interfere with the free rotation of the follower along with the neck ring due to the heavy thrust upon the ball bearings 211 and for other reasons as will hereinafter appear. For this purpose, when the plunger is moved upwardly as above described, downward pressure upon the sleeve 163 is relieved, which relieves downward pressure upon the spring plate 215 and permits it to move up until the upper surface of the member 217 comes into engagement with the lower surface of the stationary bushing 162. At this time substantially all the compression of the heavy springs 214 is relieved and the downward pressure which it is desired to maintain is measured by the compression of the relatively light springs. This sufficiently relieves the thrust upon the ball bearings, so that the follower 208 and its sleeve 209 may freely rotate with the neck ring 44 during subsequent operations.

After the glass article has been completed the neck ring or chuck is opened as aforesaid to permit its release. During this time the follower 208 is urged downwardly by the light springs and tends to push the completed article out of the neck ring or chuck and onto a suitable receiving mechanism (not shown) at a speed determined by the speed of opening of the neck ring or chuck. This speed of opening is governed by the configuration of the cam which cooperates with roller 61 (Fig. 1) which moves the lever 52 to depress the cover plate 49. Inasmuch as there is no intermediate member in the present machine between the press follower 208 and the plunger 158, there is no possibility of any portion of the glass article shrinking upon such an intermediate member and producing as a result of a forced stripping action fine broken particles of glass which have in certain prior art machines found their way into the interior of the completed article and caused trouble. The follower 208 thus has a dual function of serving to shape and confine the lip of the article during its formation and also of assisting in its ejection from the machine upon opening of the neck ring or chuck. It will be further noted that in the present machine it is unnecessary to raise the press and blow head prior to the ejection of the completed article, which has been found to be a material advantage.

Means are provided for admitting pressure to the interior of an article after the pressing plunger has been stripped from the glass. For this purpose, the follower member 208 is formed with an internal cavity having straight sides at its lower portion to cooperate with the lateral sides of the upper part of the plunger and make a glass-tight fit between these parts when the plunger is at its lowermost position. The upper portion of the member 208 is, however, flared to some extent so that a clear air passage between it and the plunger is provided at the uppermost position of the latter as shown in Figs. 2 and 14. Pressure is admitted to the space between the plunger and its follower and the sleeve for the latter through a passage or bore 219 in the cylindrical extension 160 of the casting 131. This passage or bore communicates with a horizontal bore 220 (Fig. 14) and thence through a suitable pressure duct 221 with a valve 222 (Figs. 11, 13 and 14). The valve 222 is of the poppet type and includes a stem 223 to which a valve head 224 is attached, the head being urged toward its closed position by a compression spring 225 surrounding the valve stem and extending between a shoulder on the valve casing and a suitable collar 226 secured to the valve stem 223. A rocker member 227 is pivotally mounted upon the rocker shaft 121 and carries an arm having an extension 228 adapted to contact with the end of the valve stem 223. The arm of the rocker member 227 also carries a cam roll 229 adapted to be engaged by a suitably shaped cam secured in a groove in the upper cam groove 12, as seen in Fig. 1. Referring to Fig. 2, the rocker 227 is provided with an upwardly elongated sleeve surrounding the rocker shaft 121 on which sleeve the rocker 194 and a second rocker 230 are mounted for free rotation. The purpose and functions of the rocker 230 will be described hereinafter. Thus by providing a suitably shaped cam at the proper position on the cam drum 12, the valve 222 may be opened at the proper time or times against the compression of the spring 225 to admit pressure to the interior of an article P, which admission of pressure may take place before and/or after the glass has been enclosed within the blow mold. The supplying of pressure to the valve 222 will be hereinafter described.

*Reheating burner, construction, mounting and operation—Elongation control*

There is provided means for reheating and/or cooling the partially formed glass articles intermediate the pressing operation and the final blowing thereof in the final blow mold for controlling the development of the article and particularly for controlling its elongation. For this purpose there is employed a burner for directing a stream of a combustible medium toward the article P depending from the neck ring or chuck for reheating that article if and as may be desired after the plunger has been stripped from the interior thereof and the blank mold moved downwardly to its outer inoperative position as above described.

As shown in the accompanying drawings, particularly Figs. 2, 7 and 14, there is provided a burner including a nozzle 231 which is adjustably mounted in a head 232 on the end of an arm 233 which is pivoted for movement about a vertical axis on the lower end of the shaft or column 130, as illustrated at 234.

Means are provided for conducting fluid fuel and preferably also a combustion supporting medium to the burner, such means being diagrammatically illustrated in Fig. 14 and including a passage 235 (Fig. 2) for both these media which communicates with an axial bore 236 in the lower end of the column 130. This bore communicates through a lateral port with an annular groove 237 formed on this column which in turn communicates through a bore 238 in the arm 233 with the burner nozzle 231. It is contemplated that the flame from burner nozzle 231 will be operated continuously if used at all and subject only to manual adjustment at desired times.

Experience with use of a machine built substantially in accordance with the disclosure hereof has demonstrated that normally when the glass supplied to the machine is in suitable condition, it is unnecessary to employ the reheating means above described or the cooling means hereinafter to be more specifically described. The provision, however, of such means is desirable in a machine of general application and the same may be used to good effect to correct slight faults in the condition of the glass which may be supplied to the machine.

Means are provided for moving the arm 233 and the burner nozzle 231 carried thereby to and from their operative positions, such means preferably being resilient in their action. For this purpose the arm 233 is preferably formed integral with an arm 239 (Fig. 7). Through an enlarged loop opening in the end of the arm 239 extends a link 240 (Fig. 2) having an enlarged head or stop at one side of the arm 239. The stop is not clearly illustrated, but is of conventional design. Extending between the other side of the arm 239 and a suitable collar 241 on the link 240 is a compression spring 242, so that upon movement of the link 240 to the right as seen in Fig. 2 the burner will be positively moved out of its operative position; while upon movement of this link to the left as seen in that figure, the burner will be resiliently moved to its operative position subject to the compression of the spring 242, should the burner strike some obstruction, such for example as the blank mold or its carrier, thus preventing breakage of the parts. At its right hand end, as seen in Figs. 2 and 7, the link 240 is pivoted to a rocker member 243. The rocker member 243 is sleeved upon the rocker shaft 89 which is fixedly mounted at its upper end in a socket in the bracket member 80 and at its lower end in a socket in a bracket member 244, both these bracket members being rigidly secured to the frame casting 19 of the unit. The rocker member 243 is provided with an arm carrying a cam roller 245, which cooperates with a suitably shaped cam secured in a groove 14 in the lower cam drum 7, as best seen in Figs. 1 and 7. For urging the cam roller 245 against its associated cam and for moving the burner toward its operative position when permitted by the configuration of that cam, there is provided a tension spring 246 extending between one arm of the rocker member 243 and a suitable anchorage 247 (Fig. 2), shown as an eye-bolt secured in the extension 107 of the frame member 19. Thus the burner nozzle 231 is resiliently moved in the direction to move it toward its operative position and is positively withdrawn therefrom through the action of the cam and the cam roller 245, the rocker member 243 and the link 240.

In some instances, particularly when the glass received by the machine is relatively hot, it may be desirable in conditioning the glass in the period in its formation intermediate the pressing operation, above described, and the final blowing operation, later to be described, to cool the partially formed article rather than to heat it. For this purpose the fluid fuel and combustion supporting medium supplied to the burner are cut off and means are provided for directing a jet of cooling air onto the glass during the period provided for its elongation under the influence of gravity and for reheating. As shown in Figs. 5 and 6, there is provided an air nozzle 247a beneath the neck ring shelf 39 and directed at the partially formed glass article P depending from the neck ring or chuck. This nozzle is supported from an elbow 247b which is threaded into the neck ring shelf 39. Air is supplied to this elbow and nozzle through a passage in the neck shelf 39 from the pipe 247c under the accurate control of a needle valve 247d, which is adapted to be operated by a hand wheel 247e. In practice it has been found that by proper adjustment of this valve, it is possible to control the elongation of the parison or partially formed glass article within very narrow limits, for example one-eighth of an inch.

*Blow mold and bottom plate mounting and operation*

Secured to the main frame casting 19 of the unit, as seen in Fig. 7, is a housing 248 which carries the vertical pivot member 249 upon which the blow mold carriers 250 are mounted. The blow mold carriers 250 are provided with suitable recesses for receiving interchangeable blow mold halves 251 of the desired shape for forming the articles to be made, the blow mold halves being secured to their holders as by bolts 252.

Means are provided for opening and closing the halves of the blow mold about a partially formed article of glassware P suspended from the neck ring or chuck, the pivot 249 being so located that when the halves are closed, they will be properly aligned to enclose the article thus supported. For this purpose the blow mold holders 250 are connected by links 253 to a head 254 mounted on the outer end of an arm 255 which is secured to the upper end of the shaft 256 journaled in the housing 248. Adjacent to its lower end, the shaft 256 is provided with a laterally extending arm 257 (Fig. 8), which is connected by a link 258 to a rocker member 259 (Figs. 1, 2 and 7). The rocker member 259 is sleeved upon the rocker shaft 89 and carries a cam roller 260 cooperating with a cam 261 suitably adjustably secured in one of the grooves 14 in the lower cam drum 7. For urging the cam roller 260 against its cam 261 and causing the closing of the blow mold halves when such action is permitted by the configuration of the cam 261, there is provided a vertical pintle 262 at the outer end of the arm 257 (Fig. 8) by which this arm is connected with the link 258. A pair of tension springs 263 is provided each of which has one end secured about the pintle 262 and the other end connected to a fixed anchorage on a vertical rod 264 extending between a pair of bracket members 265 (Figs. 1 and 8) rigid with the housing 248. Thus there is provided means for resiliently closing the halves of the blow mold under the action of the springs 263 and for positively opening these halves by the linkage including the cam 261, the cam roller 260, the rocker member 259, the link 258, the arm 257, the shaft 256, the arm 255 and the links 253.

At some times it may be desired to lock the blow mold halves open. This may be done by means of a manually operated pin 266 (Figs. 1 and 7) extending freely through a suitable aperture in the arm 255 and adapted to be engaged behind a shoulder 267. As shown, the pin 266 is provided at its upper end with a cross pin which is normally adapted to rest upon the upper end of the bearing through which this pin extends. The bearing is, however, provided with a pair of aligned slots 268 into which this cross pin may slide when the pin 266 is turned to the proper angle, so that the pin 266 may be moved downwardly to engage behind the shoulder 267. This will retain the springs 263 at their stretched position and retain the blow mold halves open irrespective of the shape of the portion of the cam 261 opposite the cam roller 260.

It is also desired that the bottom plate for the blow mold be moved to its operative position in timed relation with the closing of that mold and preferably as a result of this closing movement. For this purpose the bottom plate, which is shown diagrammatically by dot and dash lines in Fig. 8 at 269, is mounted for free vertical adjustment, as by means of a screw 270 (Fig. 1) with respect to its carrying arm 271 and may be locked in such desired position by means of a split ring and clamping collar controlled by a screw 272. The arm 271 is mounted for free pivotal movement about the horizontally disposed shaft 272 (Fig. 8). Means are provided for moving the arm 271 about the axis of the shaft 272 to move it from a substantially vertical inoperative position up to a substantially horizontal operative position. For this purpose the shaft 272 is provided with an extension member 273 secured thereto at its outer or left hand end, as seen in Fig. 8. Between an extended portion of the member 273 and an extended portion 274 of the arm 271 is positioned a compression spring 275 (Fig. 1). Thus when the shaft 272 is rotated to move the member 273 in a clockwise direction, as would be seen looking from the left of the showing of Fig. 8, the arm 271 is resiliently moved toward its operative position. For rotating the shaft 272, it is provided on its right hand end, as seen in Fig. 8, with a beveled gear sector 275a which is adapted to mesh with a complementary beveled gear sector 276 rigidly mounted upon the shaft 256. Thus when the shaft 256 is rotated through the means above described for closing the blow mold, the shaft 272 will be rotated and thus will resiliently move the arm 271 and the bottom plate 269 rigid therewith toward its operative position. The parts are so arranged that the bottom plate is adapted normally to reach its operative position slightly before the blow mold is closed and there to remain due to the engagement of the arm 271 with a suitable stop (not shown) until the blow mold is fully closed to close upon the bottom plate in a manner well known in the art and hence not particularly illustrated in the accompanying drawings.

*Blow mold lock and actuating means therefor*

The tension springs 263 (Figs. 1 and 8) above described tend to hold the blow mold in its closed position. However, under certain circumstances, especially when using hot molds as opposed to paste molds, a relatively heavier pressure is used within the blow mold and it is desirable to provide means for positively holding the halves of this mold in their closed position during the final blow. For this purpose there is provided, in connection with the machine of this application, a blow mold lock. This lock is best shown in Figs. 2 and 7 and comprises a yoke member 277, including a pair of projections forming inwardly directed shoulders 278 which are adapted to engage shoulders 279 on the blow mold carriers 250. The member 277 is pivotally mounted on a vertical axis 280 at its center to an arm 281 extending from a sleeve 282 which is freely mounted upon the lower end of the shaft 130 above the sleeve which holds the burner arm 233. These two sleeves are prevented from downward movement along the shaft 130 by a collar 283 secured to the lower end of the shaft. The arm 281 is connected by a pivoted link 284 with a rocker 285 sleeved upon the rocker shaft 89. This rocker member includes an arm provided with a cam roll 286 which is adapted to cooperate with a suitably shaped cam secured in the uppermost groove of the lower cam drum 7. For urging the cam roll 286 against its associated cam and for moving the blow mold lock to its operative position when such action is permitted by the configuration of that cam, there is provided a tension spring 287 extending between one arm of the rocker member 285 and a fixed anchorage, which in this case is shown as an eye bolt 288, (Fig. 7) secured to a collar on the blank mold shaft 102. Thus the blow mold lock will be moved to operative position to lock the halves of the blow mold in their closed position surrounding a glass article held in the neck ring by the action of the spring 287 when permitted by the roller 286 riding into a low portion of its associated cam, and will be positively retracted to its inoperative position to unlock the halves of the blow mold, permitting opening movement thereof, upon the roller 286 riding upon a high portion of its associated cam, the latter movement resulting in a tensing of the spring 287.

*Water spray for blow mold halves*

In paste mold operation, it is customary either to spray water upon the halves of the blow mold when in open position or to immerse these halves in a bath of water during a portion, at least, of their inoperative time. The first of these methods is employed in the present machine. For this purpose there are provided a pair of spray heads 289 (Figs. 1, 4, 5, 6 and 14) having spray openings therein suitably located and directed in order to supply a spray of water onto the interior of the blow mold halves when the blow mold is in its fully opened position. These heads are mounted upon suitable stems 290 which are adjustably mounted, as by set screws 291, in brackets 292 and 293 extending from the casing member which houses the neck ring rotating gear 64, this housing being rigid with the neck ring shelf or bracket 39.

Water is supplied to the spray heads 289 through suitable ducts, diagrammatically illustrated at 294 and 295, from a valve generally indicated at 296, Figs. 1, 12 and 14. Water is conducted to the valve 296 through a passage 297 which may be controlled by a manually operable shut off 298, in the event that it is desired to cut off the water supply altogether. The valve 296, as best seen in Fig. 14, is of the poppet type, including a head 299 movable toward and away from a suitable seat and arranged so that when the head 299 rests upon the seat the supply of water to the spray heads is shut off. The head 299 is mounted upon a valve stem 300 and is urged to a position to engage its seat by a compression spring 301 extending between a shoulder upon the valve casing and a suitable abutment 302 secured to the valve stem 300. There is provided in connection with the casing for valve 296 a drip pan to receive any water which may leak out along the valve stem. This water may be conducted to any suitable point through a drip pipe indicated at 302a in Figs. 1 and 12.

For operating the valve 296 to admit water to the spray heads when desired, there is provided on the upper rocker shaft 121 and pivoted on the extension sleeve of the rocker member 227, a rocker member 230 (Figs. 2 and 12), which has formed thereon an abutment shoulder 303 engaging the outer end of the valve stem 300 and also is provided with a cam roller 304 cooperating with a suitable cam on the upper cam drum 12. The location of this valve with respect to the rest of the parts of the unit is best seen in Fig. 1. The rocker 230 is also provided with a stop shoulder or extension 305 (Fig. 12) which prevents its movement in a direction away from the valve more than a certain distance. Thus when the roller 304 rides up upon a high part of its associated cam, it will serve to open the valve 296 against the action of the spring 301 by unseating the valve head 299 and thus permitting a supply of water to be sprayed onto the mold halves through the spray heads 289.

*Cooling means for various parts of the machine and for glass*

Cooling means are provided in connection with the machine forming the subject matter of this invention for supplying cooling wind or cooling air under pressure to cool various operating parts of the device and in one instance, presently to be described, for supplying cooling air under pressure directly to cool the glass article being formed.

Considering first the means for supplying cooling wind to the blow mold halves, wind is supplied as above generally set forth to the chamber 6 (Fig. 1) within the main structure of the machine and passes substantially continuously therefrom through a plurality of openings 306 to a cored portion 307 in the lower turret ring 18.

If desired, the ring 18 may be formed with an annular chamber surrounding that portion of the member 3 in which the openings 306 are formed. In any event, it is to be considered that cooling wind is continuously supplied to the chamber 307 in the lower turret ring 18. The cooling wind passes from the chamber or chambers 307 into the hollow cored portion of the main frame member 19 of each unit which, as shown in Figs. 2, 5, 7 and 8, are each formed with a pair of cored passages 308 and 309. These passages communicate with each other adjacent to the lower end of the frame member 19 so that both are supplied with wind from the passage 307. The wind supplied to the passage 309 is for cooling the blow mold. This wind is controlled by a damper mechanism generally indicated at 310 (Fig. 1). From a part of the main frame casting 19 above the damper 310 is a lateral opening 311 (Fig. 2) which communicates with a cored passage 312 (Fig. 8) in the interior of the housing 248 which supports the blow mold and its bottom plate. To the housing 248 are attached a pair of nozzle members 313 and 314 which are hollow and communicate with the passage 312. The upper ends of these members form nozzles 315 and 316 (Fig. 7) which are directly under the blow mold halves respectively when these halves are in their outer or open position. Thus the blow mold halves when in their open position may be cooled by blowing thereon a continuous controllable amount of wind.

The wind passing through the vertical passage 308 in the main unit frame 19 is controlled by a damper which may be either of the solid or butterfly type, and which is indicated in Fig. 2 in a diagrammatic manner by the dotted outline 317. The passage 308 widens out at its upper end at 318 as illustrated in Figs. 2 and 5, and communicates with a cored passage 319 (Fig. 2) in the neck ring shelf or bracket 39. This portion is uninterrupted by the portion of the bracket through which the shaft 130 passes, (Fig. 2) and communicates with an annular space 320 about the neck ring and its operating mechanism. Excessive passage of wind downwardly without performing useful work in cooling the mechanism is prevented by a plate member 321 rigidly secured in the neck ring shelf 39, which, however, permits a small amount of air to pass downwardly and assist in cooling the blank mold. The escape of air upwardly is also relatively limited due to the arrangement of the parts, as clearly illustrated in Fig. 2, so that the cooling wind is permitted to serve to its fullest extent in cooling the neck ring and its operating mechanisms.

Means are also provided for cooling the pressing plunger. For this purpose preferably high pressure air is used which is admitted to the head 167 (Fig. 2) of the pressing plunger through a passage 322. This passage preferably includes a section of flexible tube to permit of the movement of the plunger, as above set forth. Air passes through lateral ports in the head 167 to the center of the head and thence downwardly through a central tube 323 to the lowermost end of the cavity within the plunger head 153, thence upwardly again between the tube 323 and the sleeve 159 which forms the stem of the plunger, and escapes therefrom through a plurality of openings 324 in this sleeve or stem. This manner of cooling the pressing plunger is in many respects similar to that described in detail in the Canfield Patent 1,878,465 above referred to.

In paste mold operation it is customary during the final blow to locate the final blow mold at a point spaced a material distance below the under side of the neck ring or chuck, perhaps three-eighths to one-half an inch, thus leaving an intermediate portion of glass laterally exposed out of contact with any mold surface. When final blowing pressure is admitted to the interior of an article in the final blow mold, there is a tendency for the glass in the intermediate unconfined portion to expand, which tendency sometimes results in an undue expansion of this portion of the glass. There is also a tendency at this point for a relative twisting action between the portion of glass held by the neck ring or chuck and that portion in the final blow mold, due to the relative rotation of the glass and this mold, resulting sometimes when the glass is too hot in such a deformation of the article as will render it unusable. In order to guard against these two difficulties, there may be provided in connection with the present machine a means for directing a stream of cooling air upon the exposed portion of glass intermediate the neck ring and final blow mold.

This means is illustrated in the accompanying drawings as an air nozzle 325 (Fig. 2). Pressure is conducted to this nozzle through an air duct 326, diagrammatically illustrated in Fig 14, from a valve, generally indicated at 327 (Figs. 11 and 14). This valve is constructed in the same way as valve 222 which supplies blowing air to the interior of the article being formed and may be operated by a common operating means therewith, namely, the arm 228 of the rocker member 227, as illustrated in Fig. 11. Thus the supplying of cooling air to the nozzle 325 is in synchronized time relation with the supplying of blowing pressure to the interior of the article being formed and further these pressures are supplied concomitantly and in response to the rotation of the turret by the provision on the turret of a suitable cam cooperating with the cam roller 229. The air supplied through the nozzle 325 will serve to cool the glass at the exposed portion and thus retard its expansion under the influence of the blowing pressure supplied within the article and also will tend to rigidify the glass to a point such that the distortion of the article being formed, due to the relative rotation of the glass within the final blow mold, will be minimized, if not wholly prevented.

Experience with the machine in actual operation has demonstrated that with suitable glass, the use of the last mentioned cooling means is unnecessary and such use may readily be dispensed with.

Distribution of various fluids

Referring now to Figs. 1 and 14, the central column 11 of the machine is provided at its upper end with a reduced portion 328 on which is rigidly mounted a fluid distributing column 329. This column is provided with a plurality of longitudinal passages, including the passage 330 for air under pressure, the passage 331 for gas, and the passage 332 for water. These passages communicate through lateral ports with annular chambers within collars 333, 334 and 335 respectively. The collars 333, 334 and 335 are provided with abutments or bosses, as illustrated at 336, which are adapted to seat within suitable apertures in a member 337 secured to the upper turret ring 21 thus causing the continued rotation of the collars 333, 334 and 335 as long as the turret is rotated.

The collar 333 communicates through an air duct 338 with an annular high pressure air chamber 339 formed in the upper turret ring 21, which communicates through a plurality of passages 340 with each of the several units. Supply of the high pressure air through the passage 340 may be controlled by a manually operated valve 341. The high pressure air chamber 339 also communicates through the passages 322 under control of a manually operated valve 342 with each of the plungers for supplying the cooling air for these plungers. A second annular air chamber 343 is provided in the upper turret ring 21 for low pressure air, this chamber communicating with the high pressure chamber 339 through a passage 344 controlled by a manually operable valve 345 and having interposed therein a suitable pressure reducing valve 346 for predetermining the pressure in the chamber 343. The chamber 343 communicates with each of the several units through passages 347 which communicate directly with the valves 222 of each unit, these valves controlling the supplying of blowing air to expand the glass articles being formed. In each unit the high pressure air passage 340 communicates through a T-connection 348 and a passage 349 with the valve 327 which controls the supply of cooling air through the nozzle 325 to cool the intermediate portion of the glass between the neck ring and the final blow mold. The passage 247c which supplies air for controlling the elongation of the parison P is shown as a branch of the passage 349. Another branch of the T-connection 348 communicates through the passage 145 with the valve 144 which controls the application of pressure to the press and blow head operating the cylinder within the casting 131. Pressure is also continuously conducted through the center portion of the valve 144 and through the intermediate passage 117 to the valve controlling the application of pressure to the blank mold operating cylinder 101.

The gas admitted to the interior of the collar 334 is distributed to each of the several units through passages 350 and passes through a manually operable gas valve 351 to the common gas and air supply passage 352 which communicates with the passage 235, Figs. 2 and 14. High pressure air may also be conducted from the passage 349 through the branch passage 353 to the common passage 352 for the burner under control of a manually operable valve 354.

The collar 335 to which water is admitted communicates with each of the several units through branch lines 355 which communicate directly with the passage 297 leading to the valve 296 which controls the supplying of water to the spray nozzles 289, as above set forth.

Cycle of the machine

Figure 16:
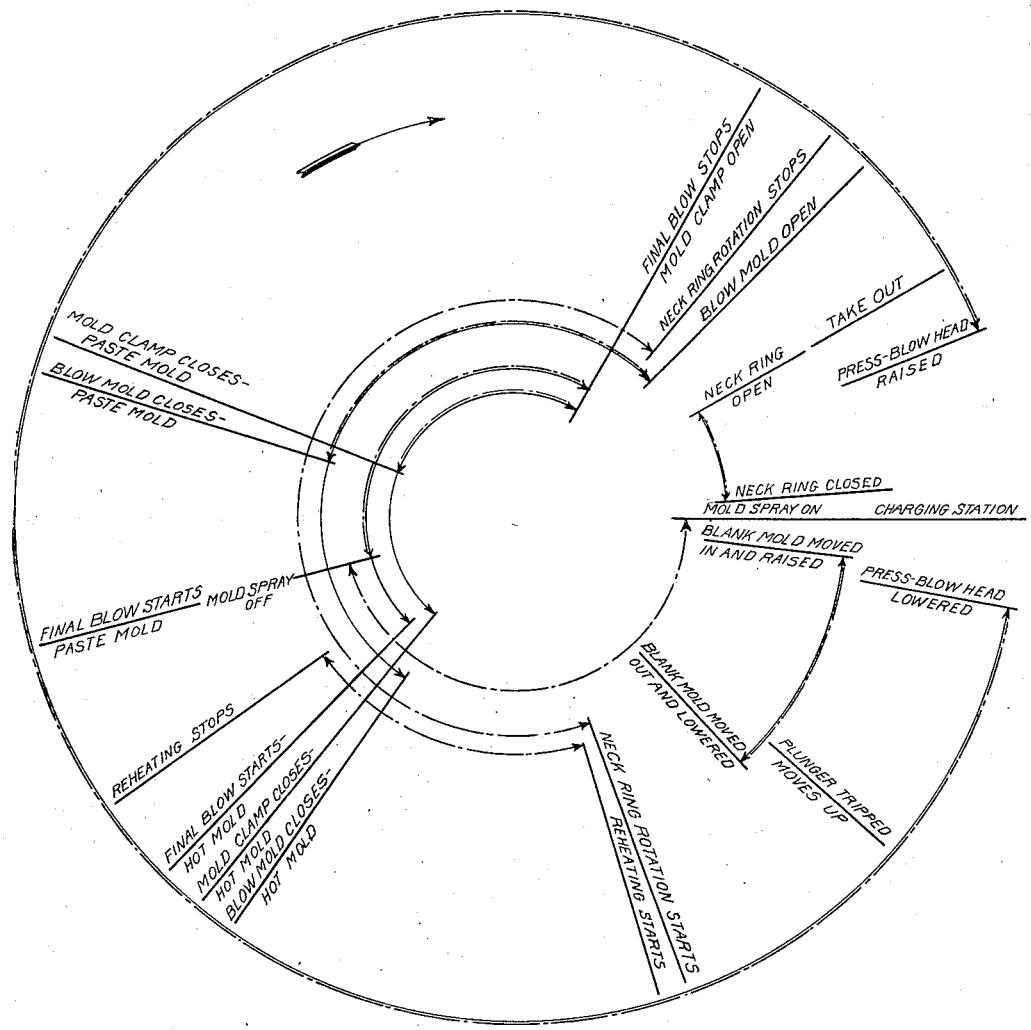
Fig. 16 is a cycle chart showing two possible cycles according to which the machine may be used for different purposes.

The construction and operation of each of the several working instrumentalities of one unit of the machine has been described in detail, as has also the mounting of the several units and the provisions for continuously rotating and operating these units. In Fig. 16 there is shown a diagram of two characteristic cycles which may be used for paste mold or iron mold operation, the duration of operations for the paste mold cycle being indicated by the dot and dash circular lines and for the iron mold cycle by the full circular lines. It is believed that the diagram in Fig. 16 will be self-explanatory as regards the cycle of operation due to the legends thereon and that this diagram taken in connection with the particular description of the operation of the several parts of the machine will completely disclose the manner of operation of the machine to each of two different methods. Furthermore, it has been stated that the several cams mounted on the lower and upper cam drums 7 and 12 respectively are adjustable about their drums and also that they are interchangeable with cams of different shapes so that various cycles may be employed in operating the machine, those particularly disclosed being for purposes of illustration only.

Conclusion

It will be understood from the foregoing specification that the present machine includes a relatively large number of individual operating mechanisms in a proper relation to each other and that certain of the mechanisms and principles involved in their use may have separate utility apart from the rest. The machine illustrated and described in this application is therefore to be considered merely as illustrative of one embodiment of my invention and not as limiting upon the scope thereof, the limitations of my present invention being expressed in the appended claims, which are to be construed as broadly as the state of the prior art permits.

I claim:

1. Apparatus for forming hollow glassware by a pressing operation and a subsequent blowing operation, comprising a press mold adapted to be supplied with charges of molten glass, a pressing plunger cooperable therewith, a press follower surrounding said plunger, a neck ring or chuck cooperating with the above named parts in forming the lip portion or neck of the article to be made, means for relatively moving said mold and said plunger to shape a charge of glass into a pressed blank and form thereon a lip or neck portion intermediate said neck ring or chuck and said follower by a pressing operation, means effective during the pressing operation for exerting a relatively heavy resilient force on said follower tending to move it toward said neck ring or chuck and said mold, means effective subsequent to the pressing operation for stripping said plunger from the pressed glass blank and simultaneously reducing the effective force tending to move said follower toward said neck ring or chuck without moving it, means to strip said mold from the pressed blank, a blow mold, means for expanding the glass to the shape of said blow mold while it remains supported by said neck ring or chuck, means for thereafter removing said blow mold from about the glass, and means for thereafter opening said neck ring or chuck for the release of the finished article therefrom, whereby said follower moving under the influence of the reduced force acting thereon will cause the glass article to be moved out of contact with said neck ring or chuck at a speed determined by the speed of opening thereof.

2. Apparatus for forming hollow glassware by a pressing operation and a subsequent blowing operation, comprising a press mold adapted to be supplied with charges of molten glass, a pressing plunger cooperable therewith, a press follower surrounding said plunger for assisting in imparting the desired form to the neck or lip portion of the article to be made, a neck ring or chuck cooperating with the above named parts in forming another part of the neck or lip portion of the article, means for relatively moving said mold and said plunger to shape a charge of glass into a pressed blank and form thereon a lip or neck portion intermediate said neck ring or chuck and said follower by a pressing operation, means effective during the pressing operation for exerting a relatively heavy resilient force on said follower tending to move it toward said neck ring or chuck and said mold, means effective subsequent to the pressing operation for stripping said plunger from the pressed glass blank and simultaneously reducing the effective force tending to move said follower toward said neck ring or chuck without moving it, means to strip said mold from the pressed blank, a blow mold, means for expanding the glass to the shape of said blow mold while it remains supported by said neck ring or chuck, means for thereafter moving said blow mold from about the glass, and means for thereafter opening said neck ring or chuck for the release of the finished article therefrom, said follower having at least a part of its glass contacting surface formed to provide for a lateral component of force between the glass and said follower, whereby said follower moving under the influence of the reduced force acting thereon will cause the glass article to be moved out of contact with said neck ring or chuck at a speed determined by the speed of opening thereof, and whereby said follower is effective to maintain the article centered and prevent it sticking to one side or the other of the neck ring or chuck during the removal of the article therefrom.

3. Apparatus for forming hollow glassware by a pressing operation and a subsequent blowing operation, comprising a press mold adapted to be supplied with charges of molten glass, a pressing plunger cooperable therewith, a press follower surrounding said plunger for assisting in imparting the desired form to the neck portion or lip of the article to be made, a neck ring or chuck cooperating with the above named parts in forming the lip portion or neck of the article to be made and formed as two complementary portions pivoted on spaced parallel horizontal axes above the operative position thereof, means for relatively moving said mold and said plunger to shape a charge of glass into a pressed blank and form thereon a lip or neck portion intermediate said neck ring or chuck and said follower by a pressing operation, means effective during the pressing operation for exerting a relatively heavy resilient force on said follower tending to move it toward said neck ring or chuck and said mold, means effective subsequent to the pressing operation for stripping said plunger from the pressed glass blank and simultaneously reducing the effective force tending to move said follower toward said neck ring or chuck without moving it, means to strip said mold from the pressed blank, a blow mold, means for expanding the glass to the shape of said blow mold while it remains supported by said neck ring or chuck, means for thereafter removing said blow mold from about the glass, and means for thereafter opening said neck ring or chuck by movement of the complementary portions thereof about their respective axes, said follower having its glass contact portion shaped to effect a centering of the glass article during its removal from said neck ring or chuck and to prevent the glass sticking thereto, whereby said follower moving under the influence of the reduced force acting thereon will cause the glass article to be moved centrally downward out of contact with said neck ring or chuck at a speed determined by the speed of opening thereof.

4. Apparatus for forming hollow glassware of the paste mold type by a pressing operation and a subsequent blowing operation, comprising a press mold adapted to be supplied with a charge of molten glass, a pressing plunger cooperable therewith, a press follower surrounding said plunger and shaped to form the top portion of the lip of the article to be made, a neck ring or chuck cooperating with the above named parts and forming another part of the lip portion of the article to be made, means for lowering the pressing plunger and follower with respect to said mold and said neck ring to shape a charge of glass into a pressed blank and to form thereon a lip intermediate said neck ring or chuck and said follower by a pressing operation, a plurality of relatively heavy springs for exerting a relatively heavy downward pressure on said follower during the pressing operation, means effecting subsequent to the pressing operation for moving said plunger upwardly to strip it from the pressed blank while retaining said follower in its lowermost position and for simultaneously relieving the pressure upon said springs, a plurality of relatively light springs effective to exert a relatively light downward force upon said follower after the pressure on said heavy springs has been relieved, whereby to exert a relatively light force downward upon said follower to retain it against said neck ring during subsequent operations, means to strip said mold from the pressed blank by a movement at least the initial portion of which is vertically downward, means for rotating said neck ring with the glass article supported thereby, means for controlling the elongation of the glass while all portions of it with the exception of the lip portion are out of contact with any mold surface, a blow mold, means for admitting fluid pressure through said follower and said neck ring or chuck to expand the glass in said blow mold during the rotation of the glass with respect to said blow mold, means for thereafter stripping said blow mold from about the glass to leave it depending from said neck ring or chuck, and means for thereafter opening said neck ring for the release of the glass therefrom, whereby the relatively light pressure exerted on said follower by said light springs will move said follower downwardly to move the completed article out of contact with said neck ring at a speed determined by the speed of opening thereof.

5. Apparatus for forming articles of glassware, comprising a press mold adapted to be supplied with charges of molten glass, a pressing plunger cooperable therewith, a press follower surrounding said plunger for assisting in imparting the desired form to the glass, means for relatively moving said mold and plunger to press a charge of glass to a desired form and thereafter for relatively moving said plunger and mold to strip said plunger from the pressed glass without relatively moving said mold and said follower, means effective during the pressing operation for exerting a relatively heavy resilient force on said press follower tending to move it toward said mold, and other and separate means effective after the stripping of the plunger from the pressed glass for exerting a relatively light resilient force on said press follower tending to move it toward said mold.

6. Apparatus for forming articles of glassware by a process including a pressing operation and a subsequent blowing operation, comprising a neck ring, a blank mold cooperable therewith and adapted to be supplied with charges of molten glass, a combined pressing and blowing head including a pressing plunger cooperable with said neck ring and said blank mold and a press follower surrounding said plunger and cooperable with said neck ring for assisting in imparting the desired configuration to the portion of glass pressed into contact therewith, means for relatively moving said plunger and said neck ring and blank mold to press a charge of glass to a desired form and for thereafter relatively moving said plunger with respect to said follower, said neck ring and said blank mold to strip said plunger from the pressed glass, means effective during the pressing operation for exerting a relatively heavy resilient force on said press follower tending to move it toward said neck ring, means effective subsequent to the pressing operation and the stripping of said plunger from the pressed glass to strip said blank mold from the pressed glass leaving it depending from said neck ring, a blow mold, means to cause said blow mold to enclose the glass depending from said neck ring, means for admitting fluid pressure from said head through said neck ring to expand the glass to the shape of said blow mold, and other and separating means effective after the stripping of the pressing plunger from the pressed glass and during the blowing operation on the glass in said blow mold for exerting a relatively light resilient force on said press follower tending to move it toward said neck ring.

7. Apparatus for forming articles of glassware of the paste mold type by a process including a pressing operation and the subsequent blowing operation, comprising a neck ring, a blank mold cooperable therewith and adapted to be supplied with charges of molten glass, a combined pressing and blowing head including a pressing plunger and a press follower cooperable with said neck ring and blank mold, means for moving said head into cooperative relation with said neck ring and blank mold to press a charge of glass therein, means thereafter operative to raise said plunger to strip it from the pressed glass in said blank mold without moving said follower, means effective during the pressing operation for exerting a relatively heavy resilient force on said press follower tending to move it toward said neck ring and blank mold, means operative subsequent to the stripping of the press plunger from the pressed glass for stripping the blank mold from about the glass leaving it depending from said neck ring, other and separate means effective in response to the stripping movement of the press plunger for relieving the relatively heavy resilient pressure on said press follower and for exerting a relatively light resilient force thereon tending to retain it against said neck ring, means for rotating said neck ring and said press follower during certain at least of the subsequent operations upon the glass, a blow mold, means for closing said blow mold about the glass depending from said neck ring, and means for admitting fluid pressure through said head and said neck ring for expanding the glass to the shape of the cavity of said blow mold while said neck ring and the glass held therein are rotating with respect to said blow mold.

8. Apparatus for forming articles of glassware, comprising a press mold adapted to be supplied with charges of molten glass, a pressing plunger cooperable therewith, a stem by which said plunger is carried, means for actuating said plunger to move it into cooperative relation with said mold to press a charge of glass therein, a press follower surrounding said plunger for assisting in imparting the desired form to the glass, a spring plate loosely surrounding the stem of said plunger, spring means extending between said spring plate and said follower for exerting a resilient pressure on said follower during the pressing operation, and means operated in synchronized timed relation to the movements of said plunger for moving said spring plate longitudinally of said stem to predetermine the amount of force exerted on said follower by said spring means during the pressing operation.

9. Apparatus for forming articles of glassware by a process including a pressing operation and a subsequent blowing operation, comprising a neck ring, a blank mold cooperable therewith and adapted to be supplied with charges of molten glass, a combined pressing and blowing head cooperable with said neck ring and said blank mold and including a pressing plunger for pressing a charge of glass therein, means for moving said head into cooperative relation with said neck ring and blank mold to press a charge of glass therein, a press follower surrounding said plunger and forming a part of said head, said follower being cooperable with said neck ring to engage a portion of the glass pressed thereinto, a spring plate mounted about the stem of said press plunger and movable with respect thereto, spring means extending between said spring plate and said follower, means for effecting a desired movement of said spring plate on the stem of said press plunger to apply a relatively heavy resilient pressure to said follower during the pressing operation, means for retracting said plunger subsequent to the pressing operation to strip it from the pressed glass, means operating concomitantly with the retracting movement of said plunger for moving said spring plate a predetermined variable amount variably to control the resilient pressure exerted on said follower during subsequent operations, means for stripping said blank mold from about the pressed glass, a blow mold, means to cause said blow mold to enclose the glass depending from said neck ring, and means to supply blowing pressure through said head and said neck ring to expand the glass to the shape of the blow mold.

10. Apparatus for forming articles of glassware, comprising a press mold adapted to be supplied with charges of molten glass, a pressing plunger cooperable therewith, a stem on which said plunger is mounted, means for moving said plunger and stem to press a charge of glass in said mold and for thereafter moving said plunger and stem to strip the plunger from the pressed glass in said mold, a press follower surrounding said plunger for assisting in imparting the desired form to the glass, a spring plate surrounding said stem and movable with respect thereto, a plurality of relatively heavy springs extending between said spring plate and said follower and disposed in equally spaced relation about said stem, a plurality of longer but relatively lighter springs also extending between said spring plate and said follower and disposed in equally spaced relation about said stem, means for so positioning said spring plate with respect to said stem during the pressing operation that said heavy springs are compressed and a relatively heavy pressure is exerted on said follower tending to move it toward said mold, and means operated by the stripping movement of said plunger for so positioning said spring plate that pressure on said heavy springs is relieved and the pressure exerted on said follower is measured by the compression of said longer and lighter springs.

11. Apparatus for forming articles of glassware of the paste mold type by a process including a pressing operation and a subsequent blowing operation, comprising a neck ring, a blank mold cooperable therewith and adapted to be supplied with charges of molten glass, a combined pressing and blowing head cooperable with said neck ring and said blank mold, means for moving said head toward and away from said neck ring and said blank mold, said head including a pressing plunger and a stem by which said plunger is carried, means for relatively moving said plunger and stem with respect to the moving means for said head, means for setting said plunger in its lowered position with respect to the head moving means prior to the pressing operation, means for holding said plunger in such lowered position prior to and during the pressing operation, a press follower rotatably mounted with respect to said head and cooperable with said neck ring, a spring plate surrounding said stem and movable longitudinally thereof, a plurality of relatively heavy compression springs disposed between said spring plate and said follower in equally spaced relation about said stem, a plurality of relatively lighter and longer springs also disposed in equally spaced relation about said stem and extending between said spring plate and said follower, means effective in response to the setting of said plunger in its lowered position with respect to its actuating means for positioning said spring plate for predetermining a relatively heavy pressure on said follower through said relatively heavy springs during the pressing operation, means for releasing said plunger and for causing its upward movement with respect to the head moving means to strip the plunger from the pressed glass, means operating concomitantly with and as a result of the upward stripping movement of said plunger for relieving the pressure on said relatively heavy springs and causing the downward pressure on said press follower to be measured by the compression of said relatively light springs, means operative during at least a part of the time consumed by subsequent operations upon the glass for rotating said neck ring and said press follower while the relatively light pressure only is exerted on the latter, means for stripping said blank mold from about the pressed glass leaving it depending from said neck ring, a blow mold, means for causing the blow mold to surround and enclose glass depending from said neck ring, and means for supplying blowing pressure through said head and said neck ring to expand the glass to the shape of said blow mold during the rotation thereof with respect to said blow mold.

12. Apparatus for forming articles of glassware of the paste mold type, comprising a neck ring or chuck adapted to engage and support a portion of an article of glassware being formed, a blow mold in which the article is to be blown to the desired shape, means for supporting said blow mold in cooperative relation to said neck ring or chuck for the final blowing operation and in a position such that a material portion of glass intermediate the blow mold and the neck ring or chuck is laterally exposed out of contact with any mold part so that it may freely expand, means for supplying blowing pressure through said neck ring or chuck for expanding the glass to conformity with the internal cavity of said blow mold, means to cause a relative rotation between said neck ring or chuck and said blow mold during the supplying of said blowing pressure within the glass, and means for directing a cooling fluid onto the exposed portion of the glass intermediate said neck ring or chuck and said blow mold for cooling and rigidifying the glass of that portion and thus retarding expansion of that portion of the glass and tending to prevent deformation of the article being formed due to relative twisting of different parts thereof.

13. Apparatus for forming articles of glassware of the paste mold type, comprising a neck ring or chuck adapted to engage and support a portion of an article of glassware being formed, a blow mold in which the article is to be blown to the desired shape, means for supporting said blow mold in cooperation to said neck ring or chuck for the final blowing operation and in a position such that a material portion of glass intermediate the blow mold and the neck ring or chuck is laterally exposed out of contact with any mold part so that it may freely expand, means for supplying blowing pressure through said neck ring or chuck for expanding the glass to conformity with the internal cavity of said blow mold, means to cause a relative rotation between said neck ring or chuck and said blow mold during the supplying of said blowing pressure, means for directing cooling fluid onto the exposed portion of the glass intermediate said neck ring or chuck and said blow mold for cooling and rigidifying the glass of that portion tending to prevent deformation of the article, and means for synchronizing the application of the cooling fluid with the operations of the other parts of the apparatus including the supplying of blowing pressure.

14. Apparatus for forming articles of glassware of the paste mold type, comprising a neck ring or chuck adapted to engage and support a portion of the article of glassware being formed, a blow mold in which the article is to be blown to the desired shape, means for supporting said blow mold in cooperative relation to said neck ring or chuck for the final blowing operation and in a position such that a material portion of glass intermediate the blow mold and the neck ring or chuck is laterally exposed out of contact with any mold part so that it may freely expand, means including a valve for supplying blowing pressure through said neck ring or chuck for expanding the glass to conformity with the internal cavity of said blow mold, means to cause a relative rotation between said neck ring or chuck and said blow mold during the supplying of said blowing pressure, means including another valve for supplying and directing a cooling fluid onto the portion of the glass intermediate said neck ring or chuck and said blow mold for cooling and rigidifying the glass of that portion tending to prevent deformation of the article being formed, and a common automatic mechanical means for operating both said valves, whereby the application of blowing pressure to the interior of an article being formed and the application of cooling air to the exposed portion of that article occur concomitantly.

GEORGE E. ROWE.